United States Patent
Babcock et al.

(10) Patent No.: US 6,281,309 B1
(45) Date of Patent: Aug. 28, 2001

(54) FLOURINATED SOLID ACIDS AS CATALYSTS FOR THE PREPARATION OF HYDROCARBON RESINS

(75) Inventors: Laura M. Babcock; Dennis G. Morrell, both of Hockessin; John N. Kostas, Wilmington, all of DE (US); Andrew Bell, Lakewood, OH (US)

(73) Assignee: Eastman Chemical Company, Kingsport, TN (US)

(*) Notice: Subject to any disclaimer, the term of this patent is extended or adjusted under 35 U.S.C. 154(b) by 0 days.

(21) Appl. No.: 09/003,594

(22) Filed: Jan. 7, 1998

Related U.S. Application Data

(60) Provisional application No. 60/035,217, filed on Jan. 8, 1997, provisional application No. 60/034,579, filed on Jan. 9, 1997, and provisional application No. 60/035,797, filed on Jan. 10, 1997.

(51) Int. Cl.[7] .................................. C08F 4/06; C08F 4/00; C08F 10/14

(52) U.S. Cl. .................... 526/201; 526/222; 526/226; 526/234; 526/217; 526/225; 526/283; 526/290; 526/335; 526/336; 526/340.2; 526/340.3; 526/346; 526/347.1; 526/348.2; 526/348.3; 526/348.4; 526/348.6; 526/348.7; 502/159; 502/168; 502/171; 502/216; 502/224

(58) Field of Search .................................. 526/201, 222, 526/226, 234, 206, 217, 225, 283, 290, 335, 336, 340.2, 340.3, 346, 347.1, 348.2, 348.3, 348.4, 348.6, 348.7; 502/159, 168, 171, 216, 224

(56) References Cited

U.S. PATENT DOCUMENTS

| Re. 31,443 | 11/1983 | McDaniel et al. ............. 526/98 |
|---|---|---|
| 2,301,966 | 11/1942 | Michel et al. ................... 260/683 |
| 2,507,864 | 5/1950 | Moore et al. .................. 260/683.15 |
| 2,559,576 | 7/1951 | Johnstone ..................... 260/683.15 |
| 2,626,290 | 1/1953 | Fell et al. ..................... 260/683.15 |
| 2,626,291 | 1/1953 | Betts ............................. 260/683.15 |
| 2,632,777 | 3/1953 | Pines ................................ 260/666 |
| 2,642,402 | 6/1953 | Corner et al. ..................... 252/435 |
| 2,694,686 | 11/1954 | Reeves et al. ..................... 252/435 |
| 2,721,889 | 10/1955 | Murphree et al. ............. 260/683.15 |
| 2,728,804 | 12/1955 | Mueller ........................ 260/683.15 |
| 2,732,398 | 1/1956 | Brice et al. ....................... 260/503 |
| 2,734,046 | 2/1956 | Nelson et al. ..................... 260/82 |
| 2,739,143 | 3/1956 | Goering et al. ................... 260/94.8 |
| 2,744,084 | 5/1956 | Arey ................................. 260/33.6 |

(List continued on next page.)

FOREIGN PATENT DOCUMENTS

| 1963684 | 8/1970 | (DE) . |
|---|---|---|
| 2836982 | 3/1979 | (DE) . |
| 0090569 | 10/1983 | (EP) . |
| 0101205 | 2/1984 | (EP) . |
| 202965 * | 11/1986 | (EP) . |
| 0202965 | 11/1986 | (EP) . |
| 0273627 | 7/1988 | (EP) . |
| 0352856A1 | 1/1990 | (EP) . |
| 0352856B1 | 1/1990 | (EP) . |
| 0367385 | 5/1990 | (EP) . |
| 0367386 | 5/1990 | (EP) . |
| 0391697 | 10/1990 | (EP) . |
| 0575866 | 12/1993 | (EP) . |
| 859391 | 9/1981 | (SU) . |
| 91/14719 | 10/1991 | (WO) . |
| 92/04115 | 3/1992 | (WO) . |
| 93/02110 | 2/1993 | (WO) . |
| 93/19103 | 9/1993 | (WO) . |
| 94/13714 | 6/1994 | (WO) . |
| 94/28036 | 12/1994 | (WO) . |
| 94/28037 | 12/1994 | (WO) . |
| 96/05236 | 2/1996 | (WO) . |

OTHER PUBLICATIONS

Patent Abstracts of Japan, vol. 6, No. 250 (C–139) Dec. 9, 1982.

Patent Abstracts of Japan, vol. 96, No. 5, May 31, 1996.

Patent Abstracts of Japan, vol. 6, No. 191 (C–127), Sep. 30, 1982.

Bittles et al., "Clay–Catlyzed Reactions of Olefins. I. Polymerization of Styrene", *Journal of Polymer Science: Part A*, vol. 2, pp. 1221–1231 (1964).

Bittles et al., "Clay–Catalyzed Reactions of Olefins, II. Catlyst Acidity and Mechanism", *Journal of Polymer Science: Part A*, vol. 2, pp. 1847–1862 (1964).

Salt, "The Use of Activated Clays as Cataysts in Polymerization Processes, with Particular Reference to Polymers of Alpha Methyl Styrene", *Clay Minerals Bulletin*, vol. 2, pp. 55–58 (1948).

Peng et al., "Electrophilic Polymerization of 1,3–Pentadiene Initiated by Aluminum Triflate", *Eur. Polym. J.*, vol. 30, No. 1, pp. 69–77 (1994).

Gandini et al., "The Heterogeneous Cationic Polymerization of Aromatic Monomers by Aluminum Triflate", *Polymer Preprints*, American Chemical Society, pp. 359–360 (1996).

(List continued on next page.)

*Primary Examiner*—David W. Wu
*Assistant Examiner*—R. Rabago
(74) *Attorney, Agent, or Firm*—B. J. Boshears; B. J. Graves, Jr.

(57) ABSTRACT

Fluorinated solid acids and supported fluorinated solid acids are used as catalysts for the polymerization of a feed stream containing at least one of pure monomer, C5 monomers, and C9 monomers to produce hydrocarbon resins. Freely-associated water may be removed from the fluorinated solid acid catalyst and/or supported fluorinated solid acid catalyst prior to use. Resins with softening points (Ring and Ball) in the range of about 5° C. to 170° C. can be prepared. These catalysts offer advantages over the traditional Friedel-Crafts polymerization catalysts since the acid sites are an integral part of the solid. The fluorinated solid acid catalysts and supported fluorinated solid acid catalysts are relatively nonhazardous, reusable catalysts which eliminate or at least reduce contamination of the resulting resin products with acid residues or by-products.

61 Claims, No Drawings

U.S. PATENT DOCUMENTS

| | | | |
|---|---|---|---|
| 2,745,890 | 5/1956 | Cahn ................ | 260/683.15 |
| 2,748,090 | 5/1956 | Watkins .............. | 252/433 |
| 2,751,331 | 6/1956 | Alpert et al. ............ | 196/39 |
| 2,753,325 | 7/1956 | Banes et al. ............ | 260/82 |
| 2,753,382 | 7/1956 | Hamner ................ | 260/666 |
| 2,758,143 | 8/1956 | Arundale et al. .......... | 260/683.15 |
| 2,766,311 | 10/1956 | Mayer et al. ............ | 260/683.15 |
| 2,766,312 | 10/1956 | Serniuk .............. | 260/683.15 |
| 2,767,234 | 10/1956 | Dauber et al. ........... | 260/683.15 |
| 2,772,317 | 11/1956 | Smith et al. ............ | 260/683.15 |
| 2,773,051 | 12/1956 | Leary ................ | 260/82 |
| 2,775,577 | 12/1956 | Schneider et al. .......... | 260/82 |
| 2,778,804 | 1/1957 | Corner et al. ............ | 252/435 |
| 2,779,753 | 1/1957 | Garabrant et al. .......... | 260/94.8 |
| 2,786,878 | 3/1957 | Arundale et al. ........... | 260/683.15 |
| 2,816,944 | 12/1957 | Muessig et al. ........... | 260/683.15 |
| 2,831,037 | 4/1958 | Schmerling ............ | 260/666 |
| 2,833,746 | 5/1958 | Haefner et al. . | |
| 2,849,428 | 8/1958 | Small et al. ............ | 260/83.5 |
| 2,852,580 | 9/1958 | Geiser ................ | 260/683.15 |
| 2,878,240 | 3/1959 | Schmerling ............ | 260/93.7 |
| 2,906,793 | 9/1959 | Rowe et al. ............ | 260/683.15 |
| 2,914,517 | 11/1959 | Schmerling ............ | 260/93.7 |
| 2,931,792 | 4/1960 | Aries . | |
| 2,938,018 | 5/1960 | Schmerling ............ | 260/93.7 |
| 2,945,845 | 7/1960 | Schmerling ............ | 260/93.7 |
| 2,976,338 | 3/1961 | Thomas .............. | 260/683.15 |
| 2,987,511 | 6/1961 | Arrigo ............... | 260/93.7 |
| 3,000,868 | 9/1961 | Powers ............... | 260/88.2 |
| 3,006,905 | 10/1961 | Geiser ............... | 260/94.2 |
| 3,006,906 | 10/1961 | Geiser ............... | 260/94.8 |
| 3,017,400 | 1/1962 | Bloch ............... | 260/94.9 |
| 3,024,226 | 3/1962 | Nolan et al. ............ | 260/948 |
| 3,037,970 | 6/1962 | Geiser ............... | 260/93.5 |
| 3,054,787 | 9/1962 | D'Alelio . | |
| 3,109,041 | 10/1963 | Child et al. ............ | 260/683.15 |
| 3,112,350 | 11/1963 | Bielawski et al. ........... | 260/683.15 |
| 3,113,165 | 12/1963 | Bloch ............... | 260/683.15 |
| 3,128,318 | 4/1964 | Meisinger et al. ........... | 260/383.15 |
| 3,133,127 | 5/1964 | Heisler et al. ........... | 260/683.15 |
| 3,136,729 | 6/1964 | Clark . | |
| 3,154,595 | 10/1964 | Donaldson et al. .......... | 260/683.15 |
| 3,166,545 | 1/1965 | Pezdirtz ............. | 260/94.8 |
| 3,179,649 | 4/1965 | Feay et al. ............ | 260/94.9 |
| 3,190,936 | 6/1965 | Child et al. . | |
| 3,190,938 | 6/1965 | Edwards . | |
| 3,221,001 | 11/1965 | Kirshenbaum et al. . | |
| 3,244,767 | 4/1966 | Nixon . | |
| 3,244,768 | 4/1966 | Holt . | |
| 3,248,341 | 4/1966 | Louvar . | |
| 3,347,676 | 10/1967 | Cripps . | |
| 3,364,191 | 1/1968 | Donaldson et al. . | |
| 3,374,285 | 3/1968 | Henke et al. . | |
| 3,383,378 | 5/1968 | Bloch et al. . | |
| 3,418,304 | 12/1968 | Langer et al. . | |
| 3,420,809 | 1/1969 | Tornqvist . | |
| 3,426,007 | 2/1969 | Kennedy . | |
| 3,426,089 | 2/1969 | De Rosset . | |
| 3,427,275 | 2/1969 | Davis et al. . | |
| 3,457,189 | 7/1969 | De Rosset . | |
| 3,463,744 | 8/1969 | Mitsche . | |
| 3,464,929 | 9/1969 | Mitsche . | |
| 3,472,791 | 10/1969 | Vesely . | |
| 3,497,568 | 2/1970 | Stepanek et al. . | |
| 3,499,877 | 3/1970 | Arnold . | |
| 3,515,769 | 6/1970 | Fishel . | |
| 3,555,107 | 1/1971 | Estes . | |
| 3,577,400 | 5/1971 | Judy . | |
| 3,586,616 | 6/1971 | Kropp . | |
| 3,597,403 | 8/1971 | Ofstead . | |
| 3,597,406 | 8/1971 | Calderon . | |
| 3,607,959 | 9/1971 | Estes et al. . | |
| 3,609,098 | 9/1971 | Brown . | |
| 3,624,060 | 11/1971 | Judy . | |
| 3,630,981 | 12/1971 | Finfinger et al. . | |
| 3,631,212 | 12/1971 | Schmerling . | |
| 3,640,981 | 2/1972 | Davis . | |
| 3,644,220 | 2/1972 | Kearby . | |
| 3,652,487 | 3/1972 | Ward . | |
| 3,652,706 | 3/1972 | Saines et al. . | |
| 3,652,707 | 3/1972 | Saines et al. . | |
| 3,657,205 | 4/1972 | Throckmorton . | |
| 3,657,208 | 4/1972 | Judy . | |
| 3,661,870 | 5/1972 | Bullard . | |
| 3,669,947 | 6/1972 | Kahn et al. . | |
| 3,689,434 | 9/1972 | Suggitt et al. . | |
| 3,689,471 | 9/1972 | Judy . | |
| 3,692,694 | 9/1972 | Kravitz et al. . | |
| 3,692,695 | 9/1972 | Suggitt et al. . | |
| 3,692,696 | 9/1972 | Kravitz et al. . | |
| 3,692,697 | 9/1972 | Kravitz et al. . | |
| 3,692,872 | 9/1972 | Calderon et al. . | |
| 3,711,425 | 1/1973 | Suggitt et al. . | |
| 3,717,586 | 2/1973 | Suggitt et al. . | |
| 3,734,866 | 5/1973 | Aylies et al. . | |
| 3,746,696 | 7/1973 | Judy . | |
| 3,753,961 | 8/1973 | St. Cyr . | |
| 3,753,962 | 8/1973 | Restaino . | |
| 3,772,255 | 11/1973 | Bell . | |
| 3,772,401 | 11/1973 | Stepanek . | |
| 3,799,913 | 3/1974 | Wheeler et al. ............ | 260/80.78 |
| 3,801,559 | 4/1974 | Ofstead et al. . | |
| 3,842,019 | 10/1974 | Kropp . | |
| 3,867,361 | 2/1975 | Calderon et al. . | |
| 3,888,789 | 6/1975 | Dombro et al. . | |
| 3,926,882 | 12/1975 | Henk et al. . | |
| 3,929,737 | 12/1975 | Tazuma et al. . | |
| 3,932,332 | 1/1976 | Douglas et al. . | |
| 3,932,553 | 1/1976 | Robert . | |
| 3,935,179 | 1/1976 | Ofstead . | |
| 3,943,116 | 3/1976 | Bell . | |
| 3,945,986 | 3/1976 | Ofstead . | |
| 3,956,180 | 5/1976 | Cavitt . | |
| 3,956,250 | 5/1976 | Campbell et al. . | |
| 3,975,336 | 8/1976 | Lal et al. . | |
| 3,980,577 | 9/1976 | Hotta . | |
| 3,987,109 | 10/1976 | Brennan et al. . | |
| 3,992,322 | 11/1976 | Dombro et al. . | |
| 3,997,471 | 12/1976 | Ofstead . | |
| 4,009,228 | 2/1977 | Tazuma et al. . | |
| 4,010,113 | 3/1977 | Ofstead . | |
| 4,013,736 | 3/1977 | Woo . | |
| 4,020,254 | 4/1977 | Ofstead . | |
| 4,028,272 | 6/1977 | Throckmorton . | |
| 4,038,471 | 7/1977 | Castner . | |
| 4,048,262 | 9/1977 | Haag et al. . | |
| 4,062,801 | 12/1977 | Burton et al. . | |
| 4,063,011 | 12/1977 | Campbell et al. . | |
| 4,064,335 | 12/1977 | Lal et al. . | |
| 4,068,062 | 1/1978 | Lepert et al. . | |
| 4,075,404 | 2/1978 | Douglas et al. . | |
| 4,105,843 | 8/1978 | Iwase et al. . | |
| 4,108,944 | 8/1978 | Tazuma et al. . | |
| 4,127,710 | 11/1978 | Hsieh . | |
| 4,130,701 | 12/1978 | Lepert . | |
| 4,133,801 | 1/1979 | Morimatsu et al. . | |
| 4,137,390 | 1/1979 | Ofstead . | |
| 4,153,771 | 5/1979 | Bullard et al. . | |
| 4,168,357 | 9/1979 | Throckmorton et al. . | |
| 4,171,414 | 10/1979 | Wagensommer et al. . | |
| 4,172,932 | 10/1979 | Ofstead et al. . | |

| | | | | | | |
|---|---|---|---|---|---|---|
| 4,205,160 | 5/1980 | Gloth et al. . | | 4,689,436 | 8/1987 | Minokani et al. . |
| 4,217,409 | 8/1980 | Inoue et al. . | | 4,699,962 | 10/1987 | Hsieh et al. . |
| 4,230,840 | 10/1980 | Katayama et al. . | | 4,711,866 | 12/1987 | Kuntz . |
| 4,233,139 | 11/1980 | Murrell et al. . | | 4,719,190 | 1/1988 | Drago et al. . |
| 4,239,874 | 12/1980 | Ofstead et al. . | | 4,719,271 | 1/1988 | Dietz . |
| 4,245,075 | 1/1981 | Lepert . | | 4,721,559 | 1/1988 | Olah . |
| 4,248,735 | 2/1981 | McDaniel et al. . | | 4,732,936 | 3/1988 | Holohan, Jr. . |
| 4,294,724 | 10/1981 | McDaniel . | | 4,744,970 | 5/1988 | Lok et al. . |
| 4,296,001 | 10/1981 | Hawley . | | 4,757,044 | 7/1988 | Cooper et al. . |
| 4,299,731 | 11/1981 | McDaniel et al. . | | 4,780,513 | 10/1988 | Powers et al. . |
| 4,301,034 | 11/1981 | McDaniel . | | 4,788,171 | 11/1988 | Klendworth . |
| 4,301,227 | 11/1981 | Hotta et al. . | | 4,791,086 | 12/1988 | Yeh et al. . |
| 4,328,090 | 5/1982 | Stuckey, Jr. et al. . | | 4,793,833 | 12/1988 | Lok et al. . |
| 4,339,559 | 7/1982 | McDaniel . | | 4,801,364 | 1/1989 | Wilson et al. . |
| 4,345,055 | 8/1982 | Hawley . | | 4,814,308 | 3/1989 | Konrad et al. . |
| 4,347,158 | 8/1982 | Kaus et al. . | | 4,822,707 | 4/1989 | Inque et al. . |
| 4,359,406 | 11/1982 | Fung . | | 4,824,554 | 4/1989 | Lok et al. . |
| 4,363,746 | 12/1982 | Capshew . | | 4,824,921 | 4/1989 | Luvinh . |
| 4,364,840 | 12/1982 | McDaniel et al. . | | 4,843,133 | 6/1989 | Short et al. . |
| 4,364,841 | 12/1982 | McDaniel et al. . | | 4,845,066 | 7/1989 | Fahey et al. . |
| 4,364,854 | 12/1982 | McDaniel et al. . | | 4,846,956 | 7/1989 | Lok et al. . |
| 4,367,352 | 1/1983 | Watts, Jr. et al. . | | 4,849,572 | 7/1989 | Chen et al. . |
| 4,368,303 | 1/1983 | McDaniel . | | 4,868,343 | 9/1989 | King et al. . |
| 4,378,306 | 3/1983 | Welch et al. . | | 4,879,425 | 11/1989 | Kukes et al. . |
| 4,382,022 | 5/1983 | McDaniel . | | 4,894,213 | 1/1990 | Flanigen et al. . |
| 4,384,086 | 5/1983 | McDaniel et al. . | | 4,900,704 | 2/1990 | McDaniel et al. . |
| 4,391,737 | 7/1983 | Bell . | | 4,912,279 | 3/1990 | Wilcher et al. . |
| 4,395,578 | 7/1983 | Larkin . | | 4,929,800 | 5/1990 | Drago et al. . |
| 4,397,765 | 8/1983 | McDaniel . | | 4,935,576 | 6/1990 | Chen . |
| 4,403,088 | 9/1983 | Smith et al. . | | 4,948,768 | 8/1990 | Kukes et al. . |
| 4,415,715 | 11/1983 | Bell . | | 4,952,544 | 8/1990 | McCauley . |
| 4,419,268 | 12/1983 | McDaniel . | | 4,952,739 | 8/1990 | Chen . |
| 4,422,957 | 12/1983 | Kaus et al. . | | 4,954,562 | 9/1990 | Anderson . |
| 4,424,139 | 1/1984 | McDaniel et al. . | | 4,956,420 | 9/1990 | White et al. . |
| 4,424,320 | 1/1984 | McDaniel . | | 4,957,889 | 9/1990 | McCauley . |
| 4,425,226 | 1/1984 | Reusser et al. . | | 4,982,045 | 1/1991 | Chen et al. . |
| 4,425,257 | 1/1984 | Miro et al. . | | 4,987,200 | 1/1991 | Datta et al. . |
| 4,434,243 | 2/1984 | Martin . | | 5,008,468 | 4/1991 | King et al. . |
| 4,434,280 | 2/1984 | McDaniel et al. . | | 5,017,662 | 5/1991 | White . |
| 4,436,948 | 3/1984 | Bobsein ............................... 585/532 | | 5,064,802 | 11/1991 | Stevens et al. . |
| 4,439,543 | 3/1984 | McDaniel et al. . | | 5,073,531 | 12/1991 | Witt . |
| 4,442,274 | 4/1984 | McDaniel et al. . | | 5,075,394 | 12/1991 | McDaniel et al. . |
| 4,442,275 | 4/1984 | Martin . | | 5,081,086 | 1/1992 | Wilcher et al. . |
| 4,444,904 | 4/1984 | Ryu . | | 5,110,778 | 5/1992 | Olah . |
| 4,444,962 | 4/1984 | McDaniel et al. . | | 5,113,034 | 5/1992 | Soled et al. . |
| 4,444,966 | 4/1984 | McDaniel . | | 5,139,761 | 8/1992 | Nair et al. . |
| 4,444,968 | 4/1984 | McDaniel et al. . | | 5,171,791 | 12/1992 | Marchand et al. . |
| 4,454,367 | 6/1984 | Sakurada et al. . | | 5,177,288 | 1/1993 | Chen . |
| 4,513,166 | 4/1985 | Sakurada et al. . | | 5,190,844 | 3/1993 | Yabuuchi et al. . |
| 4,520,121 | 5/1985 | Inkrott et al. . | | 5,191,132 | 3/1993 | Patsidis et al. . |
| 4,520,222 | 5/1985 | Reusser et al. . | | 5,191,140 | 3/1993 | Akatsu et al. . |
| 4,536,358 | 8/1985 | Welsh et al. . | | 5,198,512 | 3/1993 | Jackson et al. . |
| 4,547,474 | 10/1985 | Olah . | | 5,198,563 | 3/1993 | Reagen et al. . |
| 4,547,479 | 10/1985 | Johnson et al. . | | 5,200,379 | 4/1993 | McDaniel et al. . |
| 4,555,496 | 11/1985 | Agapiou et al. . | | 5,206,314 | 4/1993 | Mitchell et al. . |
| 4,558,170 | 12/1985 | Chen et al. . | | 5,225,493 | 7/1993 | Marchand et al. . |
| 4,565,795 | 1/1986 | Short et al. . | | 5,272,124 | 12/1993 | Wu . |
| 4,567,153 | 1/1986 | Graves . | | 5,283,301 | 2/1994 | McDaniel et al. . |
| 4,575,538 | 3/1986 | Hsieh et al. . | | 5,284,811 | 2/1994 | Witt et al. . |
| 4,588,703 | 5/1986 | Cowan et al. . | | 5,286,823 | 2/1994 | Rath . |
| 4,596,862 | 6/1986 | McDaniel et al. . | | 5,288,677 | 2/1994 | Chung et al. . |
| 4,604,438 | 8/1986 | Beuhler et al. . | | 5,321,106 | 6/1994 | Lapointe . |
| 4,618,595 | 10/1986 | Dietz . | | 5,322,910 | 6/1994 | Wu . |
| 4,618,661 | 10/1986 | Kaus et al. . | | 5,324,881 | 6/1994 | Kresge et al. . |
| 4,619,980 | 10/1986 | McDaniel et al. . | | 5,326,921 | 7/1994 | Chen . |
| 4,626,519 | 12/1986 | Miro et al. . | | 5,326,923 | 7/1994 | Cooper et al. . |
| 4,677,174 | 6/1987 | Alexander et al. . | | 5,328,881 | 7/1994 | Jackson et al. . |
| 4,680,351 | 7/1987 | Miro et al. . | | 5,328,956 | 7/1994 | Hasebe et al. . |
| 4,681,866 | 7/1987 | McDaniel et al. . | | 5,330,949 | 7/1994 | Funabahsi et al. . |
| 4,684,707 | 8/1987 | Evans . | | 5,331,104 | 7/1994 | Reagen et al. . |
| 4,686,092 | 8/1987 | Lok et al. . | | 5,332,708 | 7/1994 | Knudsen et al. . |

| | | |
|---|---|---|
| 5,338,812 | 8/1994 | Knudsen et al. . |
| 5,347,026 | 9/1994 | Patsidis et al. . |
| 5,350,723 | 9/1994 | Neithamer et al. . |
| 5,350,726 | 9/1994 | Shaffer . |
| 5,350,819 | 9/1994 | Shaffer . |
| 5,354,721 | 10/1994 | Geerts . |
| 5,362,825 | 11/1994 | Hawley et al. . |
| 5,365,010 | 11/1994 | Rao et al. . |
| 5,366,945 | 11/1994 | Kresge et al. . |
| 5,371,154 | 12/1994 | Brandvold et al. . |
| 5,382,420 | 1/1995 | Vaughan . |
| 5,384,299 | 1/1995 | Turner et al. . |
| 5,393,911 | 2/1995 | Patsidis et al. . |
| 5,399,635 | 3/1995 | Neithamer et al. . |
| 5,399,636 | 3/1995 | Alt et al. . |
| 5,401,817 | 3/1995 | Palackal et al. . |
| 5,403,803 | 4/1995 | Shaffer et al. . |
| 5,409,873 | 4/1995 | Chung et al. . |
| 5,412,024 | 5/1995 | Okada et al. . |
| 5,414,177 | 5/1995 | Chung et al. . |
| 5,414,180 | 5/1995 | Geerts et al. . |
| 5,414,187 | 5/1995 | King et al. . |
| 5,418,303 | 5/1995 | Shaffer . |
| 5,426,080 | 6/1995 | Kundsen et al. . |
| 5,436,305 | 7/1995 | Alt et al. . |
| 5,444,132 | 8/1995 | Witt et al. . |
| 5,446,102 | 8/1995 | Oziomek et al. . |
| 5,453,410 | 9/1995 | Kolthammer et al. . |
| 5,459,218 | 10/1995 | Palackal et al. . |
| 5,461,127 | 10/1995 | Naganuma et al. . |
| 5,466,766 | 11/1995 | Patsidis et al. . |
| 5,475,162 | 12/1995 | Brandvold et al. . |
| 5,491,214 | 2/1996 | Daughenbaugh et al. . |
| 5,561,095 | 10/1996 | Chen et al. . |
| 5,633,419 | 5/1997 | Spencer et al. . |
| 5,648,580 | 7/1997 | Chen et al. . |
| 5,710,225 | 1/1998 | Johnson et al. ............... 526/172 |

OTHER PUBLICATIONS

Okuhara et al., "Catalytic Chemistry of Heteropoly Compounds", *Advances in Catalysis*, vol. 41, pp. 113–252 (1996).

Misono et al., "Solid Superacid Catslysts", *Chemtech*, pp. 23–29 (Nov. 1993).

Deno et al., "Acid Catalysis in $O_2$ Oxidations and the Possible Role of the Hydroperoxy Cation, $HO_2$,",*Journal of the American Chemical Society*, 91:19, pp. 5237–5238 (Sep. 10, 1969).

Stevens, "Insite[TM] Catalysts Structure/Activity Relationships for Olefin Polymerization", *Stud. Surf. Sci. Catal.*, vol. 89, pp. 277–184 (1994).

Habimana et al., "Synthesis of Polymers Containing Pseudohalide Groups by Cationic Polymerization. 5. Study of Various Aspects of the 2–Methylpropene Polymerization Coinitiated by Hydrazoic Acid", *Macromolecules*, vol. 26, No. 9, pp. 2297–2302 (1993).

Cheradame et al., "Synthesis of Polymers Containing Pseudohalide Groups by Cationic Polymerization, 7[a)], Thiocyanato– and Isothiocyanato–functionalized Poly(2–methylpropene)", *Makromol. Chem., Rapid commun.*, 13, pp. 433–439 (1992).

Cheradame et al., "Synthesis of Polymers Containing Pseudalide groups by Cationic Polymerization, 4[4)], Cocatalysis as a Direct Route to End–capped Poly(2–methlpropene) with Pseudohalide Groups", *Makromol. Chem.*, 193, pp. 2647–2658 (1992).

Cheradame et al., "Synthesis of Polymers Containing Pseudohalide Groups by Cationic Polymerization, 3[a)], Preliminary Study of the Polymerization and Copolymerization of Alkenyl Monomers Containing Azide Groups", *Makromol. Chem.*, 192, pp. 2777–2789 (1991).

Hlatky et al., "Ionic, Base–free Zirconocene Catalysts for Ethylene Polymerization", *J. Am. Chem. Soc.*, 111, pp. 2728–29 (1989), accompanied by 48 pages of Supplementary Material.

Hlatky et al., "Metallacarboranes as Labile Anions for Ionic Zirconocene Olefin Polymerization Catalysts", *Organometallics*, 11, pp. 1413–1416 (1992), accompanied by 7 pages of Supplementary Material.

Cheradame et al., "Heterogeneous Cationic Polymerization Initiators I: Polymerization of 2–methylpropene in a Non Polar Medium", *C.R. Acad. Sci. Paris*, t. 318, Serie II, pp. 329–34 (1994), including an English language abstract.

Schmid et al., "Unbridged Cyclopentadienyl–Fluorenyl Complexes of Zirconium as Catalysts for Homogeneous Olefin Polymerization", *Journal of Organometallic Chemistry*, 501, pp. 101–06 (1995).

Alt et al., "Verbrückte Bis(fluorenyl)komplexe des Zirconiums und Hafniums als hochreaktive Katalysatoren bei der Homogenen Olefinpolymerisation. Die Molekülstrukturen von $(C_{13}H_9-C_2H_4-C_{13}H_9)$ and $(\eta^5:\eta^5-C_{13}H_8-C_{13}H_8)ZrCl_2$", *Journal of Organometallic Chemistry*, 472, pp. 113–118 (1994).

Smith et al., "Bimetallic Halides. Crystal Structure of and Ethylene Polymerization by $VCl_2 \times ZnCl_2 \times 4THF$", *Inorganic Chemistry*, vol. 24, No. 19, pp. 2997–3002 (1985), accompanied by 19 pages of Supplementary Material.

Martin, "Titanium and Rare Earth Chloride Catalysts for Ethylene polymerization", *Journal of Polymer Science: Polymer Chemistry Edition*, vol. 22, pp. 3843–3850 (1984).

Freeman et al., "Ethylene Polymerization Over organochromium Catalysts: A Comparsion Between Closed and Open Pentadienyl Ligands", *Journal of Polymer Chemistry: Part A: Polymer Chemistry*, vol. 25, pp. 1063–1076 (1987).

Clark et al., "Heats of Polymerization of 1–Butene over Silica–Alumina", *Journal of Catalysis*, 21, pp. 179–85 (1971).

McDaniel, "Controlling Polymer Properties with the Phillips Chromium catalysts", *Ind. Eng. Chem. Res.*, 27, pp. 1559–1564 (1988).

Patsidis et al., "The Preparation and Characterization of 9–Substituted Bis(flurenyl) Zirconium Dichloride Complexes", *Journal of Organometallic Chemistry*, 501, pp. 31–35, (1995).

Alt et al., "Formation and Reactivity of the Ethylene Complex $Cp_2TiC_2H_4$. The Crystal Structure of $(Cp_2TiEt)_2O$", *Journal of Organometallic Chemistry*, 349, pp. C7–C10 (1988).

Smith et al., "Synthesis of Copolymers of m–Diisopropylbenzene and m–Dimethoxybenzene", *Polymer Sci. Technol. (Plenum)*, 25, pp. 415–429 (1984).

Kennedy et al., "New Telechelic Polymers and Sequential Copolymers by Polyfuctional Initiator–Transfer Agents (Inifers I. Synthesis and Characterization of $\alpha$, $\mu$–Di–(t–chloro)polyisobutylene", *Polym. Prepr.*, 20(2), pp. 316–319 (1979).

Izumi, "Silica–Included heteropoly compounds as Insoluble, readily Separable Solid Acid Catalysts", Slides Presented at the 1995 International Chemical Congress of Pacific Basin Societies in Honolulu, Hawaii (Dec. 17–22, 1995).

Cai et al., "Study on the Oligomerization of Isobutene Using Heteropoly Acids and Their Salts as Catalysts", *Cuihua Xuebao*, pp. 370, 371, and 375 (1985).

Corma, "Inorganic Solid Acids and Their Use in Acid–Catalyzed Hydrocarbon Reactions", *Chem. Rev.*, 95, pp. 559–614 (1995).

Okuhara et al., "Acid Strength of Heteropolyacids and Its Correlation Activity", *Bull. Chem. Soc. Jpn.*, 67, pp. 1186–1188 (1994).

Vaughn et al., "High–Pressure Oligomerization of Propene over Heteropoly Acids", *Journal of Catalysis*, 147, pp. 441–454 (1994).

Okuhara et al., "Alkylation of Isobutene with Butenes Catalyzed by a Cesium Hydrogen Salt of 12–Tungstophoshoric Acid", *Chemistry Letters*, pp. 1451–1454 (1994).

Kamada et al., "Dispersion and Fixation of 12–Tungstophosphate Anion on a Silica Surface Modified with Silane Agents Having an Amine Group and Their Catalytic Properties", *Bull. Chem. Soc. Jpn.*, 66, pp. 3565–3570 (1993).

Na et al., "Skeletal Isomerization of n–Butane Catalyzed by an Acidic Cesium Salt of 12–Tungstophosphoric Acid", *Chemistry Letters*, pp. 1141–1144 (1993).

Izumi et al., "Acidic Cesium Salts of Keggin–type heteropolytungstic Acids as Insoluble Solid Acid Catalysts for Esterification and Hydrolysis Reactions", *Chemistry Letters*, pp. 825–828 (1993).

Hu et al., "Catalysis by Heteropoly Compounds XXII. Reactions of Esters and Esterification Catalyzed by Heteropolyacids in a Homogeneous Liquid Phase—Effects of the Central Atom of Heteropolyanions Having Tungsten as the Addenda Atom", *Journal of Catalysis*, 143, pp. 437–448 (1993).

Lee et al., "Catalysis by Heteropoly Compounds. 20. An NMR Study of Ethanol Dehydration in the Pseudoliquid Phase of 12–Tungstophosphoric Acid", *J. Am. Chem. Soc.*, 114, pp. 2836–2842 (1992).

Izumi et al., "Acidic Alkali Metal Salts and Ammonium Salts of Keggin–type Heteropolyacids as Efficient Solid Acid Catalysts for Liquid–phase Friedel–Crafts Reactions", *Chemistry Letters*, pp. 1987–1990 (1992).

Kozhevnikov et al., "De–t–Butylation of Phenols Catalyzed by Bulk and Supported Heteropoly Acid", *Journal of Molecular Catalysis*, 75, pp. 179–86 (1992).

Nishimura et al., "High Catalytic Activities of Pseudoliquid Phase of Dodecatungstophosphoric Acid for Reactions of Polar Molecule", *Chemistry Letters*, pp. 1695–1698 (1991).

Lee et al., "NMR Evidence for Ethyl Cation and Protonated Ethanol in the Pseudoliquid Phase of $H_3PW_{12}O_{40}$", *Chemistry Letters*, pp. 1175–1178 (1988).

Baba et al., "Heteropolyacids and their Salts Supported on Acidic Ion–Exchange Resin as Highly Active Solid–Acid Catalysts", *Applied Catalysis*, 22, pp. 321–324 (1986).

Hibi et al., "Catalysis by Heteropoly Compounds X. Synthesis of Lower Olefins by Conversion of Dimethyl Ether Over 12–Tungtophoshates", *Applied Catalysis*, 24, pp. 69–83 (1986).

Tatematsu et al., "Preparation Process and Catalytic Activity of $Cs_xH_{3-x}PW_{12}O_{40}$", *Chemistry Letters*, pp. 865–868 (1984).

Hayashi et al., "Methanol Conversion over Metal Salts of 12–Tungstophosphoric Acid", *Journal of Catalysis*, 81, pp. 61–66 (1983).

Izumi et al., "Catalysis by Heterogeneous Supported Heteropoly Acid", *Journal of Catalysis*, 84, 402–409 (1983).

Izumi et al., "Effcient Homogeneous Acid Catalysis of Heteropoly Acid and its Characterization Through Ether Cleavage Reactions", *Journal of Molecular Catalysis*, 18, pp. 299–314 (1983).

Okuhara et al., "Catalysis by Heteropoly Compounds. VI. The Role of the Bulk Acid Sites in Catalytic Reactions over $Na_xH_{3-x}PW_{12}O_{40}$", *Journal of Catalysis*, 83, pp. 121–130 (1983).

Baba et al., "The Conversion of Methanol into Hydrocarbons over Metal Salts of Heteropolyacids", *Bull. Chem. Soc. Jpn.*, 55, pp. 2657–2658 (1982).

Sebulsky et al., "Alkylation of Benzene with Dodecene–1 by Catalyzed by Supported Silicotungstic Acid", *Ind. Eng. Chem. Process Des. Develop.*, vol. 10, No. 2, pp. 272–279 (1971).

Pillai et al.,"Oligomerization of Vinylic Compounds on Montmorillonite Clay Catalysts", *React. Kinet. Catal. Lett.*, vol. 55, No. 2, pp. 251–257 (1995).

Okuhara et al., "Insoluble Heteropoly Compounds as Highly Active Catalysts for Liquid–phase Reactions", *J. Mol. Cat.*, 75, pp. 247–256 (1992).

Mizuno et al., "Heteropoloyanions in Catalysis", *Journal of Molecular Catalysis*, 86, pp. 319–342 (194).

Izumi et al., "Heteropoly Acid as Multifunctional Catalyst", *Zeolite, Clay, and Heteropoly Acid in Organic Reactions*, Chap. 3, pp. 99–161 (1992).

Ono, "Heteropoly Acid Catalysis—a Unique Blend of Acid–Base and Redox Properties", *Properties in Catalysis*, pp. 431–464 (1992).

Misono, "Heterogeneous Catalysis by Heteropoly Compounds of Molybdenum and Tungsten", *Catal. Rev.–Sci. Eng.*, 29(2&3), pp. 269–321 (1987).

Fu et al., "Perfluorooctanesulfonic Acid Catalyzed Friedel–Crafts Alkylation with Alkyl Halides", *Synthetic Communications*, 21(10&11), pp. 1273–1279 (1991).

Waller et al., "Catalysis with Nafion", *Chemtech*, 17, pp. 438–441 (Jul. 1987).

Harmer et al., "Unique Silane Modified Perflurosulfonic Acids as Versatile Reagents for New Solid Acid Catalysts", *Chem. Commun.*, pp. 1803–1804 (1997).

Harmer et al., "High Surface Area Nafion Resin/Silica Nanocomposites: A New Class of Solid Acid catalyst", *J. Am. Chem. Soc.*, vol. 118, No. 33, pp. 7708–7715 (1996).

Kawada et al., "Lanthanide Trifluoromethanesulfonates as Reusable Catalysts: Catalytic Friedel–Crafts Acylation", *J. Chem. Soc., Chem Commun.*, pp. 1157–1158 (1993).

Kobayashi et al., "The Aldol Reaction of Silyl Enol Ethers with Aldehydes in Aqueous Media", *Tetrahedron Letters*, vol. 33, No. 12, pp. 1625–1628 (1992).

Thomas et al., "Chemistry of Weakly Solvated Lanthanide–Metal Cations. Synthesis, Characterization, and Catalytic Chemistry of $[Eu(Ch_3CN)_3(BF_4)_3]_x$", *J. Am. Chem. Soc.*, 108, 4096–4103 (1986).

Holohan et al., "Hydrocarbon Resins", reprinted from *Kirk–Othmer: Encyclopedia of Chemical Technology*, vol. 12, pp. 852–869 (1980).

Chemical Abtsract No. 84:73847a (1976).

Olah et al., "Boron, Aluminum, and Gallium Tris (trifluoromethanesulfonate) (Triflate): Effective New Friedel–Crafts Catalysts", *J. Am. Chem. Soc.*, 110, pp. 2560–2565 (1988).

Collomb et al., "Cationic Polymerisation and Electrophilic Reactions Promoted by Metal Salts of Strong Acids",*Cationic Polymerization and Related Processes*, pp. 49–67 (1984).

Collomb et al., "Cationic Polymerization induced by Metal Salts—I", *European Polymer Journal*, vol. 16, pp. 1135–1144 (1980).

Collomb et al., "Cationic Polymerisation Induced by Metal Salts of Strong Acid: Kinetics and Mechanisms", Proc. IUPAC, I.U.P.A.C., Macromol. Symp., 28th, p. 136 (1982).

Lowery, "Hydrocarbon Resins", *Kirk–Othmer: Encyclopedia of Chemical Technology*, vol. 13, pp. 717–743 (1995).

Derwent Abstract No. 001575902 WPI Acc. No. 76–10285X/06(Mar. 17, 1976).

* cited by examiner

FLOURINATED SOLID ACIDS AS CATALYSTS FOR THE PREPARATION OF HYDROCARBON RESINS

CROSS-REFERENCE TO RELATED APPLICATIONS

The present application claims the priority under 35 U.S.C. §119(e) of U.S. Provisional Application No. 60/035,217, filed Jan. 8, 1997; U.S. Provisional Application No. 60/034,579, filed Jan. 9, 1997; and U.S. Provisional Application No. 60/035,797, filed Jan. 10, 1997; the disclosures of which are expressly incorporated by reference herein in their entirety. The present application expressly incorporates by reference herein the entire the disclosures of U.S. Application No. 09/003,596, filed Jan. 7, 1998, entitled "Solid Acids as Catalysts for the Preparation of Hydrocarbon Resins"; U.S. application Ser. No. 09/003,879, filed Jan. 7, 1998, entitled "Metal Halide Solid Acids and Supported Metal Halides as Catalysts for the Preparation of Hydrocarbon Resins"; and U.S. Application Ser. No. 09/003,888, filed Jan. 7, 1998, entitled "Metal Oxide Solid Acids as Catalysts for the Preparation of Hydrocarbon Resins", now U.S. Pat. No. 6,133,386; which are concurrently filed with the present application.

BACKGROUND OF THE INVENTION

1. Field of the Invention

This invention relates to fluorinated solid acids and supported fluorinated solid acids useful as catalysts for the polymerization of a feed stream containing at least one of pure monomer, C5 monomers, and C9 monomers to produce a hydrocarbon resin, to processes of preparing hydrocarbon resins using fluorinated solid acid catalysts and supported fluorinated solid acid catalysts, and to hydrocarbon resins produced by such processes.

2. Discussion of Background

Hydrocarbon resins are low molecular weight, thermoplastic materials prepared via thermal or catalytic polymerization. The resins may be derived from several different sources of monomers. The monomer sources include cracked petroleum distillate from oil refining, turpentine fractions (e.g., terpenes from natural product distillation), paper mill by-product streams, coal tar, and a variety of pure olefinic monomers.

The resulting hydrocarbon resins can range from viscous liquids to hard, brittle solids with colors ranging from water white to pale yellow, amber, or dark brown depending on the monomers used and the specific reaction conditions. Typically, pure monomer resins tend to be water white, C9 monomer resins tend to be amber to brown, and C5 monomer resins tend to be yellow.

Hydrocarbon resins are used extensively as modifiers in adhesives, rubber, hot-melt coatings, printing inks, paint, flooring, and other applications. The resins are usually used to modify other materials.

Pure monomer hydrocarbon resins can be prepared by cationic polymerization of styrene-based monomers such as styrene, alpha-methyl styrene, vinyl toluene, and other alkyl substituted styrenes using Friedel-Crafts polymerization catalysts such as Lewis acids (e.g., boron trifluoride ($BF_3$), complexes of boron trifluoride, aluminum trichloride ($AlCl_3$), alkyl aluminum chlorides).

Similarly, aliphatic C5 hydrocarbon resins can be prepared by cationic polymerization of a cracked petroleum feed containing C5 and C6 paraffins, olefins, and diolefins also referred to as "C5 monomers". These monomer streams are comprised of cationically polymerizable monomers such as 1,3-pentadiene which is the primary reactive component along with cyclopentene, pentene, 2-methyl-2-butene, 2-methyl-2-pentene, cyclopentadiene, and dicyclopentadiene. The polymerizations are catalyzed using Friedel-Crafts polymerization catalysts such as Lewis acids (e.g., boron trifluoride ($BF_3$), complexes of boron trifluoride, aluminum trichloride ($AlCl_3$), or alkyl aluminum chlorides). In addition to the reactive components, nonpolymerizable components in the feed include saturated hydrocarbons which can be codistilled with the unsaturated components such as pentane, cyclopentane, or 2-methylpentane. This monomer feed can be copolymerized with C4 or C5 olefins or dimers as chain transfer agents.

Also, aromatic C9 hydrocarbon resins can be prepared by cationic polymerization of aromatic C8, C9, and/or C10 unsaturated monomers derived from petroleum distillates resulting from naphtha cracking and are referred to as "C9 monomers". These monomer streams are comprised of cationically polymerizable monomers such as styrene, alpha-methyl styrene, beta-methyl styrene, vinyl toluene, indene, dicyclopentadiene, divinylbenzene, and other alkyl substituted derivatives of these components. The polymerizations are catalyzed using Friedel-Crafts polymerization catalysts such as Lewis acids (e.g., boron trifluoride ($BF_3$), complexes of boron trifluoride, aluminum trichloride ($AlCl_3$), alkyl aluminum chlorides). In addition to the reactive components, nonpolymerizable components include aromatic hydrocarbons such as xylene, ethyl benzene, cumene, ethyl toluene, indane, methylindane, naphthalene and other similar species. These nonpolymerizable components of the feed stream can be incorporated into the resins via alkylation reactions.

Although Lewis acids are effective catalysts for the cationic polymerization reactions to produce hydrocarbon resins, they have several disadvantages. Conventional Lewis acids are single use catalysts which require processing steps to quench the reactions and neutralize the acids.

Further, conventional Lewis acids also require removal of catalyst salt residues from the resulting resin products. Once the salt residues generated from the catalyst neutralization are removed, the disposal of these residues presents an additional cost. Therefore, it is of particular interest to reduce the amount of catalyst residues, particularly halogen-containing species generated in these reactions.

Another problem involved in using conventional Lewis acid catalysts, such as $AlCl_3$ and $BF_3$, is that they are hazardous materials. These conventional Lewis acid catalysts generate highly corrosive acid gases on exposure to moisture, (e.g., HF, HCl).

In addition to the traditional Lewis acids, work has been done with certain solid acid catalysts. BITTLES et al., "Clay-Catalyzed Reactions of Olefins. I. Polymerization of Styrene", *Journal of Polymer Science: Part A*, Vol. 2, pp. 1221–31 (1964) and BITTLES et al., "Clay-Catalyzed Reactions of Olefins. II. Catalyst Acidity and Measurement", *Journal of Polymer Science: Part A*, Vol. 2, pp. 1847–62 (1964), the disclosures of which are herein incorporated by reference in their entireties, together disclose polymerization of styrene with acid clay catalysts to obtain polymers having molecular weights between 440 and 2000 as determined by freezing point depression of benzene solutions. These documents disclose that the catalyst was prepared for polymerization by heating under vacuum, and that if the catalyst adsorbed moisture, the activity of the catalyst could be restored by reheating under vacuum.

SALT, "The Use of Activated Clays as Catalysts in Polymerisation Processes, with Particular Reference to Polymers of Alpha Methyl Styrene", *Clay Minerals Bulletin*, Vol. 2, pp. 55–58 (1948), the disclosure of which is herein incorporated by reference in its entirety, discloses polymerization of styrene and/or alpha-methyl styrene by using a clay catalyst to obtain polymers that range from dimers to molecular weights of about 3000.

U.S. Pat. No. 5,561,095 to CHEN et al., the disclosure of which is herein incorporated by reference in its entirety, discloses a supported Lewis acid catalyst for polymerization of olefins, including C3–C23 alpha-olefins, to obtain polymers having number average molecular weights (Mn) ranging from about 300 to 300,000. Exemplary Lewis acid supports include silica, silica-alumina, zeolites, and clays. Example 1 of CHEN et al. discloses that a Lewis acid supported on silica is heated under vacuum.

U.S. Pat. No. 3,799,913 to WHEELER et al., the disclosure of which is herein incorporated by reference in its entirety, discloses Friedel-Crafts catalysts for polymerization of polymerizable constituents, including alpha-methyl styrene, indene, vinyl toluene and styrene, to obtain polymers having a number average molecular weight (Mn) ranging from about 350 to 1200. Zinc chloride is disclosed as one of the Friedel-Crafts catalysts.

U.S. Pat. No. 3,652,707 to SAINES, the disclosure of which is herein incorporated by reference in its entirety, discloses Friedel-Crafts metal halide catalysts for polymerization of olefin hydrocarbons, including pentene, styrene and methylstyrene, to obtain polymers having a molecular weight of from about 700 to about 2500. Zinc chloride is disclosed as one of the Friedel-Crafts metal halide catalysts.

PENG et al., "Electrophilic Polymerization of 1,3-Pentadiene Initiated by Aluminum Triflate", *Eur. Polym. J*, Vol. 30, No. 1, pp. 69–77 (1994), the disclosure of which is herein incorporated by reference in its entirety, discloses aluminum triflate for polymerization of piperylene to obtain polymers having varying number average molecular weights European Patent Application 0 352 856 A1, the disclosure of which is herein incorporated by reference in its entirety, discloses use of aluminum triflate, cerium triflate, e.g., for oligomerization of C3 to C6 olefins to obtain oligomers having 6 to 24 carbon atoms.

GANDINI et al., "The Heterogeneous Cationic Polymerization of Aromatic Monomers by Aluminum Triflate", *Polymer Preprints*, American Chemical Society, pp.359–360 (1996), the disclosure of which is herein incorporated by reference in its entirety, discloses use of aluminum triflate for polymerization of C9 related monomers to obtain a polymer having a number average molecular weight (Mn) around 3000. This document also discloses that aluminum triflate could be useful for the direct "resinification" of mixtures of aromatic monomers and solvents arising from specific petroleum cuts.

Other documents, the disclosures of which are incorporated by reference in their entireties, which generally disclose the use of solid acid catalysts to polymerize monomers for the preparation of resins include U.S. Pat. No. 4,068,062 to LEPERT, U.S. Pat. No. 4,130,701 to LEPERT, U.S. Pat. No. 4,245,075 to LEPERT, and U.S. Pat. No. 4,824,921 to LUVINH.

SUMMARY OF THE INVENTION

The present invention involves the preparation of hydrocarbon resins. More particularly, the present invention involves the use of fluorinated solid acid catalysts and supported fluorinated solid acid catalysts to polymerize a feed of hydrocarbon monomers.

Hydrocarbon resins are prepared from at least one of pure monomers, C5 monomers, and aromatic C9 monomers using relatively environmentally benign, recyclable, fluorinated solid acid catalysts and supported fluorinated solid acid catalysts. In the present invention, hydrocarbon resins are prepared by cationic polymerization (e.g., Friedel-Crafts) wherein a feed stream containing at least one of pure monomer, C5 monomers, and C9 monomers is treated with a fluorinated solid acid catalyst which may include a support.

Before use, the fluorinated solid acid catalysts and/or supports may be treated to remove freely-associated water associated with the solids to maximize catalyst acidity and activity toward the polymerization. For example, the fluorinated solid acid catalyst may be calcined for a sufficient time to remove freely-associated water and/or the catalyst can be exposed to reduced atmospheric pressure. For instance, the calcining may be at a temperature up to about 700° C., preferably at a temperature between about 50° C. and 500° C. The calcining may be under reduced atmospheric pressure for up to about 8 hours, preferably between about 1 hour to 4 hours.

In accordance with one aspect, the present invention is directed to a process for making a hydrocarbon resin, including polymerizing a feed stream including at least one member selected from the group consisting of pure monomer, C5 monomers, and C9 monomers in the presence of a fluorinated solid acid catalyst to produce a hydrocarbon resin, wherein the fluorinated solid acid catalyst includes at least one member selected from the group consisting of perfluorinated ion exchange polymer, perfluoroalkanesulfonic acids containing 6 or more carbons, perfluoroalkanesulfonimide, lanthanide perfluoroalkanesulfonate containing 2 or more carbons, and aluminum perfluoroalkanesulfonate containing 2 or more carbons.

In accordance with yet another aspect, the present invention is directed to a process for making a hydrocarbon resin, including polymerizing a feed stream including at least one member selected from the group consisting of pure monomer, C5 monomers, and C9 monomers in the presence of a fluorinated solid acid catalyst to produce a hydrocarbon resin, wherein the fluorinated solid acid catalyst is added to the feed stream.

When the fluorinated solid acid catalyst is added to the feed stream, the fluorinated solid acid catalyst may be at least perfluorinated ion exchange polymer; perfluoroalkanesulfonic acid with each alkane group containing 6 or more carbons comprising at least one member selected from the group consisting of perfluorooctanesulfonic acid, perfluorododecanesulfonic acid, and perfluoroalkanesulfonic acid grafted to polymer; perfluoroalkanesulfonimide; lanthanide perfluoroalkanesulfonate where each alkane group has one or more carbon; aluminum perfluoroalkanesulfonate with each alkane group containing one or more or two or more carbon; lanthanide triflate with acid promoter; aluminum triflate with acid promoter; and supported fluorinated solid acid catalyst.

In accordance with another feature of the invention, the feed stream includes between about 20 wt % and 80 wt % monomers and about 80 wt % to 20 wt % of solvent. Preferably, the feed stream includes about 30 wt % to 70 wt % monomers and about 70 wt % to 30 wt % of solvent. More preferably, the feed stream includes about 50 wt % to 70 wt % monomers and about 50 wt % to 30 wt % of solvent. The solvent may include an aromatic solvent. The aromatic solvent may include at least one member selected from the group consisting of toluene, xylenes, and aromatic petroleum solvents. The solvent may include an aliphatic solvent. The invention may further include recycling the solvent.

In accordance with a feature of the invention, the feed stream includes at least C5 monomers. The feed stream may include at least C5 monomers, wherein cyclopentadiene and methylcyclopentadiene components are removed from the feed stream by heating at a temperature between about 100° C. and 160° C. and fractionating by distillation. The C5 monomers may include at least one member selected from the group consisting of 2-methyl-2-butene, 1-pentene, 2-methyl-2-pentene, 2-methyl-1-pentene, 2-pentene, cyclopentene, cyclohexene, 1,3-pentadiene, 1,4-pentadiene, isoprene, 1,3-hexadiene, 1,4-hexadiene, cyclopentadiene, and dicyclopentadiene. The feed stream may include at least C5 monomers, wherein the feed stream includes at least about 70 wt % of polymerizable monomers with at least about 50 wt % 1,3-pentadiene. The C5 feed stream may contain low levels of isoprene, generally contains a portion of 2-methyl-2-butene, and may contain one or more cyclodiolefins. The C5 monomers may further include isobutylene.

The feed stream may include at least C5 monomers, wherein the feed stream further includes up to about 40 wt % of chain transfer agent, preferably up to about 20 wt % of chain transfer agent. The chain transfer agent may include at least one member selected from the group consisting of C4 olefins, C5 olefins, dimers of C4 olefins, and dimers of C5 olefins. The chain transfer agent may include at least one member selected from the group consisting of isobutylene, 2-methyl-1-butene, 2-methyl-2-butene, dimers thereof, and oligomers thereof.

In accordance with a feature of the invention, the feed stream includes about 30 wt % to 95 wt % of C5 monomers and about 70 wt % to 5 wt % of a cofeed including at least one member selected from the group consisting of pure monomer, C9 monomers, and terpenes. Preferably, the feed stream includes about 50 wt % to 85 wt % of C5 monomers and about 50 wt % to 15 wt % of a cofeed including at least one member selected from the group consisting of pure monomer, C9 monomers, and terpenes.

In accordance with another feature of the invention, the feed stream includes at least C9 monomers. The C9 monomers may include at least one member selected from the group consisting of styrene, vinyl toluene, indene, dicyclopentadiene, and alkylated derivatives thereof. The C9 monomers may include at least about 20 wt % polymerizable unsaturated hydrocarbons. The C9 monomers may include about 30 wt % to 75 wt % polymerizable unsaturated hydrocarbons. The C9 monomers may include about 35 wt % to 70 wt % polymerizable unsaturated hydrocarbons.

In accordance with a feature of the invention, the feed stream includes about 30 wt % to 95 wt % of the C9 monomers and about 70 wt % to 5 wt % of a cofeed including at least one member selected from the group consisting of pure monomer, C5 monomers, and terpenes. Preferably, the feed stream includes about 50 wt % to 85 wt % of the C9 monomers and about 50 wt % to 15 wt % of a cofeed including at least one member selected from the group consisting of pure monomer, C5 monomers, and terpenes.

Many of the fluorinated solid acid catalysts and supported fluorinated solid acid catalysts function most effectively in the presence of a controlled amount of water in the monomer feed stream. In accordance with this feature of the invention, the feed stream should include less than about 500 ppm water, preferably less than about 200 ppm water, more preferably less than about 100 ppm water, and most preferably less than about 50 ppm water.

In accordance with yet another feature the invention, the feed stream is contacted with about 0.5 wt % to 30 wt %, preferably about 1 wt % to 20 wt %, more preferably about 3 wt % to 15 wt %, and most preferably 0.5 wt % to 5 wt % of the fluorinated solid acid catalyst based on monomer weight in a batch reactor.

In accordance with a feature of the invention, the fluorinated solid acid catalyst is added to the feed stream.

In accordance with another feature of the invention, the feed stream is added to a slurry of the fluorinated solid acid catalyst in solvent. The feed stream may be passed over a fixed bed of the fluorinated solid acid catalyst.

In accordance with yet another feature of the invention, the feed stream is cofed with a slurry of the fluorinated solid acid catalyst into a reactor.

In accordance with a feature of the invention, the polymerization is carried out as a continuous process or as a batch process. The reaction time in the batch process can be about 30 minutes to 8 hours, preferably about 1 hour to 4 hours at reaction temperature.

In accordance with a feature of the invention, the feed stream is polymerized at a reaction temperature between about −50° C. and 150° C., preferably between about −20° C. and 100° C., and more preferably between about 0° C. and 70° C.

In accordance with another feature of the invention, the polymerization is stopped by removing the fluorinated solid acid catalyst from the hydrocarbon resin. The fluorinated solid acid catalyst may be removed from the hydrocarbon resin by filtration. The hydrocarbon resin may be removed from a fixed bed reactor which includes the fluorinated solid acid catalyst.

In accordance with a feature of the invention, the hydrocarbon resin is stripped to remove unreacted monomers, solvents, and low molecular weight oligomers. The unreacted monomers, solvents, and low molecular weight oligomers may be recycled.

In accordance with a feature of the invention, the hydrocarbon resin is separated from a hydrocarbon resin solution.

In accordance with a feature of the invention, the feed stream includes at least pure monomer and the resulting hydrocarbon resin has a softening point as measured by ASTM-E28 "Standard Test Method for Softening Point by Ring and Ball Apparatus", between about 5° C. and 170° C. The feed stream may include at least C5 monomers, wherein the softening point of the resulting hydrocarbon resin is between about 50° C. and 150° C. The feed stream may include at least C9 monomers, wherein the softening point of the resulting hydrocarbon resin is between about 70° C. and 160° C.

In accordance with a feature of the invention, the feed stream includes at least pure monomer, wherein the hydrocarbon resin has a number average molecular weight (Mn) ranging from about 400 to 2000, a weight average molecular weight (Mw) ranging from about 500 to 5000, a Z average molecular weight (Mz) ranging from about 500 to 10,000, and a polydispersity (PD) as measured by Mw/Mn between about 1.2 and 3.5, where Mn, Mw, and Mz are determined by size exclusion chromatography (SEC).

In accordance with a feature of the invention, the feed stream includes at least C5 monomers, wherein the hydrocarbon resin has a number average molecular weight (Mn) of about 400 to 2000, a weight average molecular weight (Mw) of about 500 to 3500, a Z average molecular weight (Mz) of about 700 to 15,000, and a polydispersity (PD) as measured by Mw/Mn between about 1.2 and 5, where Mn, Mw, and Mz are determined by size exclusion chromatography (SEC).

In accordance with another feature of the invention, the feed stream includes at least C9 monomers, wherein the hydrocarbon resin has a number average molecular weight (Mn) of about 400 to 1200, a weight average molecular weight (Mw) of about 500 to 2000, a Z average molecular weight (Mz) of about 700 to 6000, and a polydispersity (PD) as measured by Mw/Mn between about 1.2 and 3.5, preferably 1.2 and 2.5, where Mn, Mw, and Mz are determined by size exclusion chromatography (SEC).

In accordance with another feature of the invention, the hydrocarbon resin is hydrogenated.

DETAILED DESCRIPTION OF THE INVENTION

The particulars shown herein are by way of example and for purposes of illustrative discussion of the various embodiments of the present invention only and are presented in the cause of providing what is believed to be the most useful and readily understood description of the principles and conceptual aspects of the invention. In this regard, no attempt is made to show details of the invention in more detail than is necessary for a fundamental understanding of the invention, the description making apparent to those skilled in the art how the several forms of the invention may be embodied in practice.

All percent measurements in this application, unless otherwise stated, are measured by weight based upon 100% of a given sample weight. Thus, for example, 30% represents 30 weight parts out of every 100 weight parts of the sample.

Unless otherwise stated, a reference to a compound or component includes the compound or component by itself, as well as in combination with other compounds and components, such as mixtures of compounds.

Before further discussion, a definition of the following terms will aid in the understanding of the present invention.

SOLID ACID: a solid which changes the color of a basic Hammett indicator with a $pK_a < 0$.

FLUORINATED SOLID ACID CATALYST: a solid acid catalyst comprising a fluorinated alkane group attached to a sulfonate functional group (e.g., Brønsted acids such as perfluorooctanesulfonic acid or sulfonic acid resins, or Lewis acids including a fluorinated alkane group attached to a sulfonate group which is covalently bonded to a metal, e.g., aluminum triflate or ytterbium triflate).

SUPPORTED FLUORINATED SOLID ACID CATALYST: a solid acid catalyst comprising a support, e.g., silica, silica-alumina, clay, zeolite, associated with a fluorinated acid having a fluorinated alkane group that is attached to a sulfonate functional group (e.g., Brønsted acids such as perfluorooctanesulfonic acid or sulfonic acid resins, or Lewis acids including a fluorinated alkane group attached to a sulfonate group that is attached to a metal, e.g., aluminum triflate or ytterbium triflate).

HYDROCARBON RESIN: a low molecular weight (i.e., a number average molecular weight of about 200 to less than about 3000 as determined by size exclusion chromatography (SEC)) thermoplastic polymer synthesized via thermal or catalytic polymerization of cracked petroleum distillates, terpenes, coal tar fractions, or pure olefinic monomers, wherein one of the monomers is at least a C5 or higher.

PURE MONOMER: a composition comprising synthetically generated or highly purified monomer species, e.g., styrene from ethyl benzene or alpha-methyl styrene from cumene.

PURE MONOMER FEED STREAM: a composition comprising any number of pure monomer species.

C5 MONOMERS: a composition derived from petroleum processing, e.g., cracking, containing unsaturated hydrocarbons comprising C5 and/or C6 olefin species boiling in the range from about 20° C. to 100° C. at atmospheric pressure.

C9 MONOMERS: a composition derived from petroleum processing, e.g., cracking, containing unsaturated aromatic C8, C9, and/or C10 olefin species with a boiling range of about 100° C. to 300° C. at atmospheric pressure.

FREELY-ASSOCIATED WATER: water associated with a solid acid catalyst or support where the water is chemisorbed and/or physisorbed.

As a general overview of the present invention, hydrocarbon resins are produced by using fluorinated solid acids as catalysts for the cationic polymerization of a feed stream containing at least one of pure monomer (e.g., styrene based monomers), C5 monomers, and C9 monomers. Resins with softening points (Ring and Ball) preferably in the range of about 5° C. to 170° C., more preferably about 30° C. to 150° C., can be prepared. These catalysts offer advantages over the traditional Lewis acid polymerization catalysts since the acid sites are an integral part of the solid. Further, for the supported fluorinated solid acids, the fluorinated acid is supported on a solid and therefore can be removed from the reaction.

Looking at the present invention in more detail, hydrocarbon resins are prepared through a polymerization reaction wherein a feed stream containing at least one of pure monomer, C5 monomers, and C9 monomers are contacted with a fluorinated solid acid catalyst. Fluorinated solid acid catalysts and supported fluorinated solid acid catalysts which are useful in the current invention include, but are not limited to, the following.
Perfluorinated ion exchange polymer (e.g., "Nafion")
Perfluoroalkanesulfonic acids
   C6 to C20 fluorinated sulfonic acids, for example
      Perfluorooctanesulfonic acid
      Perfluorododecanesulfonic acid
      Perfluoroalkanesulfonic acids grafted to polymers
Perfluoroalkanesulfonimides
Lanthanide perfluoroalkanesulfonic acid complexes, C1 to C20, for example
   Lanthanide triflate, $[Ln(OSO_2CF_3)_3]$
   Lanthanide perfluorooctanesulfonate, $[Ln(OSO_2(CF_2)_7CF_3)_3]$
   Lanthanide perfluoroalkanesulfonic acid complexes with acid promoter
      Acid promoters including organic acids such as acetic acid and mineral acids such as hydrochloric acid
Aluminum perfluoroalkanesulfonic acid complexes, C1 to C20, for example
   Aluminum triflate, $[Al(OSO_2CF_3)_3]$
   Aluminum perfluorooctanesulfonate, $[Al(OSO_2(CF_2)_7CF_3)_3]$
   Aluminum perfluoroalkanesulfonic acid complexes with acid promoter
      Acid promoters including organic acids such as acetic acid and mineral acids such as hydrochloric acid Supported perfluorinated ion exchange polymer (e.g., "Nafion")
Supported Perfluoroalkanesulfonic acids
   C6 to C20 fluorinated sulfonic acids, for example
      Perfluorooctanesulfonic acid
      Perfluorododecanesulfonic acid
      Perfluoroalkanesulfonic acids grafted to polymers
Supported Perfluoroalkanesulfonimides
Supported Lanthanide perfluoroalkanesulfonic acid complexes, C1 to C20, for example
   Lanthanide triflate, $[Ln(OSO_2CF_3)_3]$
   Lanthanide perfluorooctanesulfonate, $[Ln(OSO_2(CF_2)_7CF_3)_3]$
   Lanthanide perfluoroalkanesulfonic acid complexes with acid promoter
      Acid promoters including organic acids such as acetic acid and mineral acids such as hydrochloric acid
Supported Aluminum perfluoroalkanesulfonic acid complexes, C1 to C20, for example
   Aluminum triflate, $[Al(OSO_2CF_3)_3]$
   Aluminum perfluorooctanesulfonate, $[Al(OSO_2(CF_2)_7CF_3)_3]$
   Aluminum perfluoroalkanesulfonic acid complexes with acid promoter
      Acid promoters including organic acids such as acetic acid and mineral acids such as hydrochloric acid As mentioned previously, the above list of fluorinated solid acid catalysts and supported fluorinated solid acid catalysts is not intended to be an exhaustive list. In selecting other fluorinated solid acid catalysts which may be useful in the present invention, it is generally true that the fluorinated solid acid catalyst should be more acidic than about −3 on the Hammett scale.

For the lanthanide perfluoroalkanesulfonic acid complexes and supported lanthanide perfluoroalkanesulfonic acid complexes, preferred lanthanides include Yb, La, Nd, and Y.

Supports for the supported fluorinated solid acids include clays such as naturally occurring clay minerals such as kaolinite, bentonite, attapulgite, montmorillonite, clarit, Fuller's earth, hectorite, and beidellite; synthetic clays such as saponite and hydrotalcite; montmorillonite clays treated with sulfuric or hydrochloric acid; and modified clays (i.e., clays modified by backbone element replacement), such as aluminum oxide pillared clays, cerium modified alumina pillared clays, and metal oxide pillared clays. In addition to clays, other supports include silica, silica-alumina, mesoporous silica, mesoporous silica-alumina, and ion exchange resins. Other types of supports includes natural or synthetic zeolites such as zeolite Y, zeolite β (i.e., BEA), MFI (e.g., "Zeolite Sacony Mobil-5" ("ZSM-5")), MEL (e.g., "Zeolite Sacony Mobil-11" ("ZSM-11")), NaX, NaY, faujasite (i.e., FAU), and mordenite (i.e., MOR). The names BEA, MFI, MEL, FAU, and MOR are the framework structure type IUPAC definitions of zeolites.

Concerning supported perfluorinated ion exchange polymer, examples of these catalysts are described in WALLER et al., "Catalysis with Nafion", *Chemtech*, Vol. 17, pp. 438–441 (July 1987), and HARMER et al., "High Surface Area Nafion Resin/Silica Nanocomposites: A New Class of Solid Acid Catalyst", *J. Am. Chem. Soc.*, Vol. 118, pp. 7708–7715 (1996), the disclosures of which are herein incorporated by reference in their entireties.

Concerning supported perfluoroalkanesulfonic acids, an example of this catalyst is described in HARMER et al., "Unique Silane Modified Perfluorosulfonic Acids as Versatile Reagents for New Solid Acid Catalysts", *Chem. Commun.*, pp. 1803–1804 (1997), the disclosure of which is herein incorporated by reference in its entirety.

Before use, the fluorinated solid acid catalysts may be treated to remove freely-associated water to maximize the catalyst acidity and activity toward the polymerization. The freely-associated water may be removed by various techniques, including thermal treatment, reduced pressure treatment, dry atmosphere treatment such as nitrogen or air, or a combination thereof. While not wishing to be bound by theory, removing freely-associated water maximizes the acid strength of the fluorinated solid acid catalysts and makes the polymerizations more reproducible.

The freely-associated water may be removed from the fluorinated solid acid catalyst and/or supports by calcining which generally means heating the fluorinated solid acid catalyst and/or support to high temperature without fusing the catalyst. The fluorinated solid acid catalyst and/or support may be calcined under an inert atmosphere, such as nitrogen or dry air, or under reduced pressure. The calcining is performed for preferably up to about 8 hours or more, more preferably about 1 hour to 4 hours, preferably at temperatures up to about 700° C., more preferably about 150° C. to 250° C.

The freely-associated water removed from the fluorinated solid acid catalyst and/or support may have been derived from water (physisorbed water) or hydroxyl groups (chemisorbed water) associated with the fluorinated solid acid catalyst and/or support. By removal of substantially all freely-associated water is meant removing all or essentially all physisorbed water and removing at least a majority of chemisorbed water.

It has been discovered that by controlling the conditions under which the fluorinated solid acid catalyst and/or support is calcined, such as controlling the temperature or time under which the calcination step takes place, tailoring of the physical properties of the resultant resin, such as its softening point or its molecular weight, may be achieved.

Many of the fluorinated solid acid catalysts of the present invention are most effective in the presence of a controlled amount of water in the feed stream. For instance, the feed stream should include less than about 500 ppm water, preferably less than about 200 ppm water, more preferably less than about 100 ppm water, and most preferably less than about 50 ppm water.

Pure monomer feed streams may contain relatively pure styrene-based monomers such as styrene, alpha-methyl styrene, beta-methyl styrene, 4-methyl styrene, and vinyl toluene fractions. The monomers can be used as pure components or as blends of two or more monomer feeds to give desired resin properties. Preferred blends include about 20 wt % to 90 wt % alpha-methyl styrene with about 80 wt % to 10 wt % of one or more comonomers, preferably styrene, vinyl toluene, 4-methyl styrene or blends of these components. In addition, other alkylated styrenes can be used as monomers in this invention such as t-butyl styrene or phenyl styrene. Feed streams can be dried, if desired, and preferably contain less than about 200 ppm water, more preferably less than about 100 ppm water, and most preferably less than about 50 ppm water.

In the case of C5 resins, the petroleum feed streams contain unsaturated C5 and/or C6 olefins and diolefins boiling in the range from about 20° C. to 100° C., preferably about 30° C. to 70° C. In some cases, cyclopentadiene and methylcyclopentadiene components are removed from the feed by heat soaking at temperatures between preferably about 100° C. and 160° C., and fractionating by distillation.

Monomers found in these feedstocks may include but are not limited to olefins such as isobutylene, 2-methyl-2-butene, 1-pentene, 2-methyl-1-pentene, 2-methyl-2-pentene, as well as 2-pentene, cycloolefins such as cyclopentene, and cyclohexene, diolefins such as 1,3-pentadiene, 1,4-pentadiene, isoprene, 1,3-hexadiene, and 1,4-hexadiene, cyclodiolefins such as cyclopentadiene, dicyclopentadiene, and alkyl substituted derivatives and codimers of these cyclodiolefins. Commercial samples of this type of feed include, but are not limited to "Naphtha Petroleum 3 Piperylenes" from Lyondell Petrochemical Company, Houston, Tex., regular "Piperylene Concentrate" or "Super Piperylene Concentrate" both from Shell Nederland Chemie B. V., Hoogvilet, the Netherlands. The C5 feed streams generally contain at least about 70 wt % polymerizable monomers with at least about 50 wt % 1,3-pentadiene. The C5 feed stream may contain low levels of isoprene, generally contains a portion of 2-methyl-2-butene, and may contain one or more cyclodiolefin.

Also concerning C5 monomer feed streams, in addition to the reactive components, nonpolymerizable components in the feed may include saturated hydrocarbons which can be codistilled with the unsaturated components such as pentane, cyclopentane, or 2-methylpentane. This monomer feed can be copolymerized with C4 or C5 olefins or dimers as chain transfer agents. Chain transfer agents may be added to obtain resins with lower and narrower molecular weight distributions than can be prepared from using monomers alone. Chain transfer agents stop the propagation of a growing polymer chain by terminating the chain in a way which regenerates a polymer initiation site. Components which behave as chain transfer agents in these reactions include but are not limited to isobutylene, 2-methyl-1-butene, 2-methyl-2-butene or dimers or oligomers of these species. The chain transfer agent can be added to the reaction in pure form or diluted in a solvent. Feed streams can be dried if desired and preferably contain less than about 500 ppm water, more preferably less than about 200 ppm water, and most preferably less than about 50 ppm water.

In the case of C9 monomer resins, the feed streams contain unsaturated aromatic C8, C9, and/or C10 monomers with a boiling range of about 100° C. to 300° C. at atmospheric pressure. Aromatic C8–C10 feed streams (also referred to as C9 feed streams) can be derived from steam cracking of petroleum distillates. Monomers found in these feed stocks may include but are not limited to styrene, vinyl toluene, indene, dicyclopentadiene, and alkylated derivatives of these components. Commercial samples of this type of feed include but are not limited to "LRO-90" from Lyondell Petrochemical Company, Houston, Tex., "DSM C9 Resinfeed Classic" from DSM, Geleen, the Netherlands, "RO-60" and "RO-80" from Dow Chemical Company of Midland, Mich., and "Dow Resin Oil 60-L" from the Dow Chemical Company of Terneuzen, the Netherlands. The C9 feed stream generally contains at least about 20% by weight, preferably about 30% to 75% by weight, and most preferably about 35% to 70% by weight polymerizable unsaturated hydrocarbons. The remainder is generally alkyl substituted aromatics which can be incorporated into the resins by alkylation reactions. Feed streams can be dried if desired and preferably contain less than about 500 ppm water, more preferably less than about 200 ppm water, and most preferably less than about 50 ppm water.

The feed streams may be limited to pure monomer, C5 monomers, or C9 monomers. Alternatively, cofeed streams can be used in combination with main feed streams of pure monomer, C5 monomers, or C9 monomers. Depending upon the main feed stream, pure monomer, C5 monomers, C9 monomers, or even terpenes, and any combination thereof, may serve as a cofeed stream. Terpene feed stocks include but are not limited to d-limonene, alpha- and beta-pinene, as well as dipentene. Resins from blends of main feed streams with cofeed streams may be prepared in the range of about 30 wt % to 95 wt % main feed with about 70 wt % to 5 wt % of a cofeed, preferably about 50–85 wt % main feed and about 50 wt % to 15 wt % cofeed.

The polymerization feed stream preferably contains between about 20 wt % and 80 wt % monomers, more preferably about 30 wt % to 70 wt %, and most preferably about 40 wt % to 70 wt %. In the case of C5 resins, the feed may contain up to about 40 wt % of a chain transfer agent, more preferably up to about 20 wt %, chain transfer agents as discussed above. The feed stream also contains about 80 wt % to 20 wt % of a solvent such as toluene, octane, higher boiling aromatic solvent, aliphatic solvent, or solvent blend.

Regarding the solvents, for pure monomer polymerization, the preferred solvents are aromatic solvents. Typically toluene, xylenes, or light aromatic petroleum solvents such as "Aromatic 100" from Exxon Chemical Company, Houston, Tex., "HiSol 10" from Ashland Chemical Incorporated, Columbus, Ohio, and "Cyclosol 53" from Shell Chemical Company, Houston, Tex. can be used. These solvents can be used fresh or recycled from the process. The solvents generally contain less than about 200 ppm water, preferably less than about 100 ppm water, and most preferably less than about 50 ppm water.

For C5 polymerization, the preferred solvents are aromatic solvents. Generally, unreacted resin oil components are recycled through the process as solvent. In addition to the recycled solvents, toluene, xylenes, or aromatic petroleum solvents such as "Solvesso 100" from Exxon Chemical Company, Houston, Tex. and "Shellsol A" from Shell Chemical Company, Houston, Tex. can be used. These solvents can be used fresh or recycled from the process. The solvents generally contain less than about 500 ppm water, preferably less than about 200 ppm water, and most preferably less than about 50 ppm water.

For C9 polymerization, the preferred solvents are aromatic solvents. Generally, unreacted resin oil components are recycled through the process as solvent. In addition to the recycled solvents, toluene, xylenes, or aromatic petroleum solvents such as "Solvesso 100" from Exxon Chemical Company, Houston, Tex. and "Shellsol A" from Shell Chemical Company, Houston, Tex. can be used. These solvents can be used fresh or recycled from the process. The solvents generally contain less than about 200 ppm water, preferably less than about 100 ppm water, and most preferably less than about 50 ppm water.

Concerning the polymerization reaction conditions, a first important variable is the amount of fluorinated solid acid catalyst which is used. The fluorinated solid acids are preferably used at a level of about 0.1 wt % to 30 wt % based on the weight of the monomer. For pure monomer resins, the fluorinated solid acid concentration is preferably about 0.1 to 15 wt %, more preferably about 0.5 wt % to 10 wt %, and most preferably about 0.5 wt % to 8 wt %. For C5 monomers, the fluorinated solid acid concentration is preferably about 0.5 wt % to 30 wt %, more preferably about 1 wt % to 20 wt %, and most preferably about 3 wt % to 15 wt %. For C9 monomers, the fluorinated solid acid concentration is preferably about 0.5 wt % to 30 wt %, more preferably about 1 wt % to 20 wt %, and most preferably about 3 wt % to 15 wt %.

A second important variable in the reaction is the reaction sequence, i.e., the order and manner in which reactants are combined. In one reaction sequence, the catalyst can be added to a solution of the monomers incrementally while controlling the reaction temperature. Alternatively, in another reaction sequence, the monomer can be added incrementally to a slurry of the fluorinated solid acid catalyst in a solvent. For a set catalyst level and reaction temperature, substantially lower softening point resins are obtained when the monomer is added to a catalyst slurry. As discussed in more detail in the following paragraphs, lower molecular weights and narrow polydispersity, i.e., Mw/Mn, as measured by size exclusion chromatography, are expected when the monomer is added to the catalyst solution compared with resins where the catalyst is added to the monomer.

The molecular weight averages of the resins were measured using size exclusion chromatography, SEC. The column set for the analysis consisted of four Waters "Ultrastyragel" columns of 500, 500, 1000, and 100 Å pore size, in series, (Part Nos. WAT 010571, 010571, 010572, 010570 respectively) available from Waters Corporation, Milford, Mass. The molecular weight calibration was calculated from the peak elution times of a standard set of narrow molecular weight distribution polystyrene polymers. The calibration set encompassed 18 standards ranging in peak molecular weight from 162 to 43,900. The peak molecular weight of a narrow molecular weight standard is defined as equal to $(MwMn)^{1/2}$ (ASTM test method D3536-76). The calibration curve is defined by a third degree polynomial curve fit of a plot of log MW vs. $V_e/V_r$, where $V_e$ is the elution volume of the standard and $V_r$ is the elution volume of the reference peak, oxygen, present as dissolved air in the injected solution. The columns and detector cell (Hewlett-Packard Differential Refractometer) are maintained at 40° C. The solvent (mobile phase) is tetrahydrofuran containing 250 ppm butylated hydroxytoluene (BHT, 2,6-di-tert-butyl-4-methylphenol) as a stabilizer (the tetrahydrofuran with BHT being available from Burdick and Jackson, Muskegon, Mich.). The mobile phase reservoir is purged with helium and is maintained at a flow rate of 1 milliliter per minute. Under these conditions, BHT eluted at 35.86 minutes. Samples are dissolved in THF, 0.25% wt/vol, and filtered through a 0.45 micron pore size "TEFLON" (polytetrafluoroethylene) membrane filter prior to injection (200 microliters) into the chromatograph. The reported molecular weights are the "polystyrene equivalent" molecular weights as calculated from the calibration curve.

For the pure monomer resins, the resins produced using the current invention have number average molecular weights (Mn) ranging from about 400 to 2000, weight average molecular weights (Mw) ranging from about 500 to 5000, Z average molecular weights (Mz) ranging from about 500 to 10,000, and polydispersities (PD) as measured by Mw/Mn between about 1.2 and 3.5, typically between about 1.2 and 2.5. For the C5 hydrocarbon resins, the resins produced using the current invention have number average molecular weights (Mn) ranging from about 400 to 2000, weight average molecular weights (Mw) ranging from about 500 to 3500, Z average molecular weights (Mz) ranging from about 700 to 15,000, and polydispersities (PD) as measured by Mw/Mn between about 1.2 and 5, typically between about 1.2 and 3.5. For the C9 hydrocarbon resins, the resins produced using the current invention have number average molecular weights (Mn) ranging from about 400 to 1200, weight average molecular weights (Mw) ranging from about 500 to 2000, Z average molecular weights (Mz) ranging from about 700 to 6000, and polydispersities (PD) as measured by Mw/Mn between about 1.2 and 3.5, typically between about 1.2 and 2.5.

As mentioned previously, it is expected that narrower polydispersities and lower molecular weights are obtained when the monomer is added to the catalyst solution than when the catalyst is added to the monomer. Taking into consideration the effect of the reaction sequence, it is expected that polydispersities more narrow than those obtained using traditional Lewis acid Friedel-Crafts catalysts can be obtained using the fluorinated solid acids if desired. Narrow polydispersity is important to ensure compatibility of resin with polymers in end use applications.

A third important reaction variable is the reaction temperature. Polymerization temperatures between about −50° C. and 150° C. can be used in these reactions, however, more preferred reaction temperatures are between about −20° C. and 100° C., most preferred temperatures are between about 0° C. and 70° C. For pure monomer, the reaction temperature is preferably between about −50° C. and 100° C., more preferably between about −20° C. and 75° C., and most preferably between about −10° C. and 60° C. For C5 monomers, the reaction temperature is preferably between about −50° C. and 100° C., more preferably between about −20° C. and 75° C., and most preferably between about −10° C. and 70° C. For C9 monomers, the reaction temperature is preferably between about 0° C. and 150° C., more preferably between about 10° C. and 120° C., and most preferably between about 20° C. and 110° C. Temperature is found to have a significant effect on the properties of the resulting resins. Higher molecular weight and high softening point resins are prepared at lower reaction temperatures. The reaction time at reaction temperature is preferably between about 30 minutes and 8 hours, and more preferably between about 1 hour and 4 hours.

The polymerization process can be carried out as a continuous, semi-batch, or batch process in such diverse reactors as continuous, batch, semi-batch, fixed bed, fluidized bed, and plug flow. For instance, in continuous processes, a solution of the monomers can be passed over the catalyst in a fixed bed, or the monomers can be cofed with a catalyst slurry into a continuous reactor.

The reaction may be stopped by physically separating the solid catalysts from the products. Physical separation may render the reaction solution neutral. Furthermore, physical separation can be performed by simple filtration or by separation of the resin solutions from a fixed catalyst bed. As a result, physical separation is easy and complete such that, for many fluorinated solid acid catalysts, acid functionality and catalyst residue are not left in the resin product.

If leaching of acid is possible, then acid neutralization is required. This step is commonly known in the art as "quenching". For the fluorinated solid acid catalysts which require quenching, less salt is generated than by traditional Lewis acid catalysts.

Thus, use of fluorinated solid acid catalysts minimizes or eliminates the need for extra processing steps to quench the reactions, neutralize the catalyst, and filter the catalyst salt residues from the resulting products.

Once the fluorinated solid acid catalyst and resin solution are separated, the resin solution can be stripped to remove unreacted hydrocarbons, solvents, and low molecular weight oligomers which can be recycled through the process.

Resins obtained from this invention typically have softening points as measured by ASTM-E28 "Standard Test Method for Softening Point by Ring and Ball Apparatus" (revised 1996), varying from preferably about 5° C. to 170° C., more preferably from about 30° C. to 150° C. For pure monomer, the softening points preferably range from about 5° C. to 170° C., more preferably from about 50° C. to 150°

C. For C5 hydrocarbon resins, the softening point preferably ranges from about 5° C. to 170° C., more preferably from about 50° C. to 150° C., and most preferably about 70° C. to 130° C. For C9 hydrocarbon resins, the softening point is preferably up to about 170° C., and the softening point range is most preferably from about 70° C. to 160° C. Flowable resin or those that are liquids at room temperature can also be prepared if desired using proper reaction conditions.

After the resin is produced, it may be subsequently subjected to hydrogenation to reduce coloration and improve color stability. Hydrogenation of resins is well known in the art. For a discussion of hydrogenation, reference is made to U.S. Pat. No. 5,491,214 to DAUGHENBAUGH et al., which is incorporated herein by reference in its entirety.

The resins of the current invention can be used as modifiers in adhesives, sealants, printing inks, protective coatings, plastics, road markings, flooring, and as dry cleaning retexturizing agents.

The fluorinated solid acid catalysts of the present invention offer several advantages over Lewis acids (e.g., $AlCl_3$, $AlBr_3$, $BF_3$, complexes of $BF_3$, $TiCl_4$, and others which are traditionally used for Friedel-Crafts polymerizations). Many of these advantages are a result of the acid sites being an integral part of the solid catalysts, and/or are a result of the fluorinated acid being combined with a support.

Because the acid sites are an integral part of the solid catalyst and/or the fluorinated acid is combined with a support, contamination of the resin products or solvents with catalyst residues is minimal.

The fluorinated solid acid catalysts of the present invention can generally be regenerated and recycled to thereby minimize waste disposal of spent catalyst. In contrast, the Lewis acids are generally single use catalysts.

Further, the fluorinated solid acid catalysts of the present invention are nonhazardous when compared with traditional Lewis acid catalysts such as $BF_3$ and $AlCl_3$. The catalysts of the present invention generally do not generate corrosive or hazardous liquid or gaseous acids on exposure to moisture.

Concerning aluminum tris(trifluoromethanesulfonate), aluminum triflate, $Al(OSO_2CF_3)_3$, this catalyst is useful for the preparation of hydrocarbon resins from C5 monomer feeds containing 1,3-pentadiene as well as other linear, branched and cyclic olefin containing species. Aluminum triflate is a white solid which is insoluble in organic solvents.

It has been found that aluminum triflate behaves as a very strong solid acid catalyst for the cationic polymerization of C5 monomer feeds comprised of 1,3-pentadiene and other olefins to prepare C5 hydrocarbon resins. The catalytic activity of the aluminum complex appears to be a function of the moisture level both in the complex and in the reaction solution. A low level of residual water in the reaction solution allows the aluminum complex to have extremely strong acid character resulting in significant reaction of the double bonds in the monomer feedstock. Higher water levels appear to attenuate the acid strength of the aluminum triflate leading to a lower degree of olefin reaction in the resulting polymers. The aluminum triflate is an effective catalyst in the presence of cocatalysts, such as acetic acid, which can serve to modulate the activity of the complex and alter the reaction products. The combined effect of aluminum triflate loading, cocatalysts such as water or protic acids, and reaction conditions such as reaction temperature and monomer dilution can serve as effective means to control the cationic polymerization of C5 monomer feeds and prepare C5 hydrocarbon resins with a range of properties. The use of water as a modulator is described in PENG et al., cited above, the disclosure of which has been incorporated by reference.

The present invention will be further illustrated by way of the following Examples. Examples 1 and 2 involve pure monomer resins, Examples 3–37 involve C5 resins, and Examples 38–46 involve C9 resins. These examples are non-limiting and do not restrict the scope of the invention.

Unless stated otherwise, all percentages, parts, etc. presented in the examples are by weight.

EXAMPLE 1

This example illustrates the use of catalyst prepared from trifluoromethanesulfonic acid (triflic acid) and clay for the polymerization of pure monomer.

Catalyst Preparation

In a 1 liter 3 neck flask, 150 grams of toluene and 100 grams "F-22" Bentonite acid-leached powder (available from Engelhard, Corporation, Jackson Miss.) were agitated with an overhead stirrer. A solution of 10 grams of trifluoromethanesulfonic acid in 100 grams of toluene was added over 45 minutes. The resulting solution was stirred for 21 hours. After filtration and washing with toluene, acetone, and water, the material was rotary evaporated for 6 hours at 130° C. and 6 mm Hg.

Polymerization

A 500 milliliter three neck flask was equipped with a cooling jacket overhead stirrer, reflux condenser, gas inlet and outlet ports, thermometer, and solid addition funnel. The flask was charged with 36.6 grams of styrene (reagent grade, Aldrich, Milwaukee, Wis.), 86.6 grams of alpha-methyl styrene (reagent grade, Aldrich, Milwaukee, Wis.), and 100 grams of toluene (reagent grade, Aldrich, Milwaukee, Wis.). Prior to use, the styrene and alpha-methyl styrene were dried over molecular sieve and alumina (reagent grade, Aldrich, Milwaukee, Wis.). Also prior to use, the toluene was dried over 3 angstrom molecular sieves.

The trifluoromethanesulfonic acid on clay as prepared above, 4.0 grams, was calcined at 200° C. for 2 hours. After calcining, the 4.0 grams of catalyst was added to the reaction mixture. The temperature was maintained at 0° C.±6° C. for 180 minutes.

At the end of the reaction time, the catalyst was filtered from the reaction solution. The resin solution was rotary evaporated with a final condition of 45 minutes with a 190° C. bath temperature at <5 mm Hg.

The resulting resin had the properties listed in Table 1.

TABLE 1

| Ex. | Catalyst | Yield | Softening Point (R&B) | Molecular Weight | | |
|-----|----------|-------|-----------------------|------|------|------|
|     |          |       |                       | Mn   | Mw   | Mz   |
| 1   | Trifluoromethane sulfonic acid on clay | 77% | 112° C. | 795 | 1740 | 5330 |

EXAMPLE 2

This example illustrates the use of a lanthanide triflate as a catalyst for the polymerization of a pure monomer feed.

Catalyst Preparation

Ytterbium triflate ($Yb(O_3SCF_3)_3 \equiv Yb(OTf)_3$) was found to be able to polymerize alpha-methyl styrene (AMS) and styrene mixtures in ≈100% yield. The ytterbium triflate was prepared by adding an excess of ytterbium oxide ($Yb_2O_3$) (99.9% purity) to an aqueous solution of trifluorosulfonic acid (50% v/v) and heating at 95° C. for 90 minutes. The mixture was then filtered to remove the unreacted oxide, and water was removed from the filtrate under reduced pressure.

The yield of ytterbium triflate was 104% or 13.87 g. The yield being above 100% due to retained moisture. Prior to using the material as a catalyst, the ytterbium triflate was dried by heating under a stream of inert gas at 180° C. to 200° C. for 2 hours.

A 50:50 AMS/styrene mixture was polymerized in toluene at approximately 0° C. to give a polymeric material possessing a number average molecular weight (Mn) of 429, weight average molecular weight (Mw) of 677, a Z average molecular weight (Mz) of 1396, and a polydispersity (PD) of 1.58. It should be noted that the addition of the olefinic monomer to the solid $Yb(OTf)_3$ catalyst resulted in a spontaneous polymerization exotherm.

EXAMPLES 3–5

These examples illustrate the use of perfluorinated sulfonic acids as catalysts for the polymerization of piperylene concentrate, a C5 monomer feed.

Catalyst Preparation

Perfluorooctanesulfonic acid was prepared from the potassium salt according to the methods outlined in Synthetic Communications, 1991, 21, 1273–1279 as follows. The potassium salt of perfluorooctanesulfonic acid (98% PCR, Gainesville, Fla.), 22.4 grams, was added to a 100 milliliter round bottom flask fitted with a magnetic stirring bar, thermometer, and nitrogen inlet and outlet ports. Sulfuric acid (J. T. Baker, Pillipsburg, N.J.), 22.4 grams, was added to the reaction flask. After purging the flask with nitrogen, the reaction mixture was heated to 130–135° C. for three hours. The temperature was increased to 175–180° C. for an additional three hours. On cooling, a solid product formed and the sulfuric acid was decanted from the product. The product was purified by vacuum distillation at 140–160° C. at 0.25 mm Hg. The acid product yield was 87% based on the starting potassium salt. The perfluorooctanesulfonic acid was handled under a dry inert atmosphere and stored in a desiccator prior to use.

Polymerization

A 500 milliliter three neck flask was equipped with an overhead stirrer, reflux condenser, gas inlet and outlet ports, a thermometer and a dropping addition funnel. The flask was charged with 60 grams solvent, either toluene or octane (both reagent grade, Aldrich Milwaukee, Wis.) as indicated in Table 2 below, and 6.16 grams of perfluorooctancsulfonic acid catalyst, prepared as described above. Prior to use, the solvents were dried over 4 angstrom molecular sieves. The catalyst slurry was heated to 50° C.

Piperylene concentrate (Naphtha Petroleum 3 "Piperylenes" Lyondell Petrochemical Company, Houston, Tex.), 140 grams, was added to the nitrogen purged reaction flask via the dropping funnel over 15 minutes maintaining the 50° C. reaction temperature with external cooling or heating as needed. Prior to use, the piperylene concentrate was dried over activated alumina (Fischer 8–16 mesh). The reaction solution was stirred at 50° C. for a total reaction time of 4 hours.

Upon completion of the reaction time, the catalyst was converted back to the potassium salt by treating the reaction solution with a 30% solution of potassium hydroxide for 15 minutes. The catalyst was reclaimed by vacuum filtration from the resin solution at room temperature. The reaction flask and catalyst filter cake were then rinsed with approximately 100 milliliters of toluene.

After catalyst filtration, the resin oil was placed in a round-bottom flask which was fitted with a distillation head with an adaptor for an inlet tube, thermometer, and attached to a condenser and receiving flask. The resin oil was heated to 235° C. with a nitrogen purge followed by a steam purge at 235–245° C. to remove light oil products. The steam purge was continued until less than 1 ml of oil was collected per 100 ml of steam condensate or until 1000 ml of steam condensate was collected. The steam purge was followed by a nitrogen purge at 235° C. to remove water from the remaining resin.

The resins produced have the properties listed in Table 2.

TABLE 2

| Ex. | Solvent | Yield | Softening Point (R&B) | Molecular Weight | | | |
| --- | --- | --- | --- | --- | --- | --- | --- |
| | | | | Mn | Mw | Mz | PD |
| 3 | Toluene | 16% | 62° C. | 730 | 1100 | 5050 | 1.5 |
| 4 | Octane | 26% | 40° C. | 850 | 1390 | 7200 | 1.6 |
| 5 | Octane | 16% | 62° C. | 730 | 840 | 980 | 1.1 |

EXAMPLE 6

The following example illustrates the use of reclaimed perfluorooctane sulfonic acid as a catalyst for the polymerization of piperylene concentrate, a C5 monomer feed.

The recovered potassium salts from Examples 3–5 were converted back to the perfluorooctanesulfonic acid using the procedures discussed in Examples 3–5. The polymerization was carried out according to the procedures outlined in Examples 3–5 with the following modifications. The flask was charged with 14 grams of toluene and 5.7 grams recovered perfluorooctanesulfonic acid and heated to 50° C. for 4 hours.

The resin produced has the following properties.

| Catalyst | Reclaimed Perfluorooctanesulfonic Acid |
| --- | --- |
| Loading | 17 wt % on monomer |
| Solvent | toluene |
| Yield | 18% |
| Softening Point (R&B) | 49° C. |
| MW - SEC  Mn | 650 |
| Mw | 730 |
| Mz | 850 |
| PD | 1.1 |

EXAMPLES 7–13

These examples illustrate the use of perfluorosulfonic acid resins as solid catalysts for the polymerization of piperylene concentrate, a C5 monomer feed.

A 500 milliliter three neck flask was equipped with an overhead stirrer, reflux condenser, gas inlet and outlet ports, a thermometer and a dropping addition funnel. The flask was charged with 60 grams solvent. For Examples 7, 8, 10, 11, and 13, the solvent was toluene, and for Examples 9 and 12 the solvent was chlorobenzene (both solvents being reagent grade, Aldrich Milwaukee, Wis.). Prior to use, the solvents were dried over 4 angstrom molecular sieves. In addition to solvent, the reaction flask was charged with 10 grams of a perfluorosulfonic acid resin catalyst ("Nafion NR50", DuPont, Wilmington, Del., powder or extrudate as indicated in Table 3 below). The catalyst slurry was stirred 1 to 2 hours at room temperature prior to heating to the desired reaction temperature.

Piperylene concentrate (Naphtha Petroleum 3 "Piperylenes" Lyondell Petrochemical Company, Houston, Tex.), 140 grams, was added to the nitrogen purged reaction flask via the dropping addition funnel over 15 minutes maintaining the desired reaction temperature with external cooling or heating as needed. Prior to use, the piperylene concentrate was dried over activated alumina (Examples 7, 8, and 10) or 4 angstrom molecular sieves (Examples 9, 11, 12, 13). The reaction solution was stirred at the reaction temperature for 3–5 hours after the monomer addition was complete.

Upon completion of the reaction time, the resin solution was separated from the perfluorosulfonic acid resin catalyst by vacuum filtration at room temperature. After catalyst filtration, solvents and volatile components were removed on a rotary evaporator by heating up to 125° C. at 3 mm Hg.

As indicated in Table 3, if sufficient product remained after removal of solvent and volatile components, the resin oil was placed in a round-bottom flask which was fitted with a distillation head with an adaptor for an inlet tube, thermometer, and attached to a condenser and receiving flask. The resin oil was heated to 235° C. with a nitrogen purge followed by a steam purge at 235–245° C. to remove light oil products. The steam purge was continued until less than 1 ml of oil was collected per 100 ml of steam condensate or until 1000 ml of steam condensate was collected. The steam purge was followed by a nitrogen purge at 235° C. to remove water from the remaining resin. The products which steam distilled were isolated and analyzed as oils.

The resins produced have the properties listed in Table 3. Regarding the below listed yields, the "steam resid." yield refers to the yield of steam stripped resin based on monomer and "heavy oil" refers to the amount of oil collected based on monomer weight.

catalyst slurry was stirred overnight at room temperature to swell the catalyst.

Piperylene concentrate (Naphtha Petroleum 3 "Piperylenes" Lyondell Petrochemical Company, Houston, Tex.), 140 grams, was added to the nitrogen purged reaction flask via the dropping addition funnel over 15 minutes maintaining the desired reaction temperature with external heating as needed to maintain a reaction temperature of 50° C. Prior to use, the piperylene concentrate was dried over activated alumina. The reaction solution was stirred at 50° C. for 5 hours after the monomer addition was complete.

The resulting resin solution was separated from the sulfonic acid resin catalyst by vacuum filtration at room temperature. After catalyst filtration, solvents and volatile components were removed on a rotary evaporator by heating up to 125° C. at 1 mm Hg.

The resins produced have the properties listed in Table 4.

TABLE 4

| Example | Catalyst | Yield | Molecular Weight | | |
|---|---|---|---|---|---|
| | | | Mn | Mw | Mz |
| 14 | "Amberlyst ® 1010" 5 grams | 9% | 410 | 670 | 1420 |
| 15 | "Amberlyst ® 36(dry)" 10 grams | 3% | 360 | 730 | 4920 |
| 16 | "Amberlyst ® 35(dry)" 10 grams | 11% | 450 | 770 | 1760 |

TABLE 3

| Ex. | Catalyst | Reaction Temp. | Yield | Molecular Weight | | | |
|---|---|---|---|---|---|---|---|
| | | | | Mn | Mw | Mz | PD |
| 7 | NR50 Extrudate | 50° C. | 6% steam resid. 31% heavy oil | 830 370 | 990 460 | 1270 650 | 1.2 1.2 |
| 8 | NR50 Extrudate | 30° C. | 10% steam resid. 10% heavy oil | 740 330 | 1020 410 | 1520 530 | 1.4 1.3 |
| 9 | NR50 Extrudate | 30° C. | 6% steam resid. 11% heavy oil | 990 420 | 1230 540 | 1940 830 | 1.2 1.3 |
| 10 | NR50 Extrudate | 0° C. | 2%[1] | 360 | 630 | 1010 | 1.7 |
| 11 | NR50 Powder | 30° C. | 4% steam resid. 13% heavy oil | 870 360 | 1220 500 | 1770 740 | 1.4 1.3 |
| 12 | NR50 Powder | 30° C. | 4%[1] | 400 | 830 | 6660 | 2.1 |
| 13 | NR50 Powder | 0° C. | 3%[1] | 430 | 1570 | 9940 | 3.6 |

Comparative Examples 14–16

These examples illustrate the polymerization of piperylene concentrate, a C5 monomer feed, with styrene/divinylbenzene sulfonic acid resins.

A 500 milliliter three neck flask was equipped with an overhead stirrer, reflux condenser, gas inlet and outlet ports, a thermometer and a dropping addition funnel. The flask was charged with 60 grams toluene (reagent grade, Aldrich Milwaukee, Wis.) and 5 or 10 grams of a styrene/divinylbenzene sulfonic acid resin catalyst, as indicated in Table 4 ("Amberlyst 1010", "Amberlyst 36(dry)", or "Amberlyst 35(dry)", available from Rohm and Haas, Philadelphia, Pa.), which catalyst had been calcined at 100° C. under vacuum (2–5 mm Hg) for 6 hours. Prior to use, the solvent was dried over 4 angstrom molecular sieves. The

EXAMPLES 17 AND 18

These examples illustrate the use and reuse of triflic acid on clay as a catalyst for the polymerization of piperylene concentrate, a C5 monomer feed.

A 500 milliliter three neck flask was equipped with an overhead stirrer, reflux condenser, gas inlet and outlet ports, a thermometer and a dropping addition funnel. The flask was charged with 60 grams toluene (reagent grade, Aldrich Milwaukee, Wis.) and 15 grams of a 0.1 wt % triflic acid on clay catalyst (United Catalyst, Louisville, Ky.) which had been calcined at 250° C. under a dry nitrogen purge for 1 hour. Prior to use, the solvent was dried over 4 angstrom molecular sieves. The catalyst slurry was heated to 50° C. with stirring.

Piperylene concentrate (Naphtha Petroleum 3 "Piperylenes", Lyondell Petrochemical Company, Houston, Tex.), 140 grams, was added to the nitrogen purged reaction flask via the dropping addition funnel over 15 minutes maintaining a 50° C. reaction temperature. Prior to use, the piperylene concentrate was dried over activated alumina. The reaction solution was stirred at 50° C. for 6 hours after the monomer addition was complete.

The resulting resin solution was separated from the clay catalyst by vacuum filtration at room temperature. After catalyst filtration, solvents and volatile components were removed on a rotary evaporator by heating up to 125° C. at 1 mm Hg.

After catalyst filtration, the resin oil was placed in a round-bottom flask which was fitted with a distillation head with an adaptor for an inlet tube, thermometer, and attached to a condenser and receiving flask. The resin oil was heated to 235° C. with a nitrogen purge followed by a steam purge at 235–245° C. to remove light oil products. The steam purge was continued until less than 1 ml of oil was collected per 100 ml of steam condensate or until 1000 ml of steam condensate was collected. The steam purge was followed by a nitrogen purge at 235° C. to remove water from the remaining resin. The products which steam distilled were isolated and analyzed as oils.

The catalyst was collected, washed with toluene at 90° C. for 1.5 hours, filtered, and dried at 75° C. under vacuum (1 mm Hg) to give a fine powder. This reclaimed catalyst was calcined as described above and used for a second reaction in Example 18 to polymerize piperylene concentrate.

The resins produced have the properties listed in Table 5.

TABLE 5

| Ex. | Catalyst | Yield | Softening Point (R&B) | Molecular Weight | | | |
|---|---|---|---|---|---|---|---|
| | | | | Mn | Mw | Mz | PD |
| 17 | First Pass | 18% resin | 41° C. | 1320 | 2200 | 4590 | 1.7 |
| | | 13% oil | | 450 | 780 | 3100 | 1.7 |
| 18 | Second Pass | 14% resin | 30° C. | 1400 | 2240 | 3950 | 1.6 |
| | | 16% oil | | 430 | 760 | 2330 | 1.8 |

EXAMPLES 19–22

These examples illustrate the use of aluminum tris (trifluoromethanesulfonic acid), also referred to as the tris (triflate) salts, alone or in the presence of cocatalysts for the polymerization of piperylene concentrate, a C5 monomer feed.

A 250 milliliter three neck flask was equipped with an overhead stirrer, reflux condenser, gas inlet and outlet ports, and a thermometer. The flask was charged with 15 grams toluene (reagent grade, Aldrich Milwaukee, Wis.) and catalyst in the weight percent based on monomer, as described below in Table 6.

Concerning the catalyst, the aluminum tris(triflate), Al(OTf)$_3$, (Strem Chemical, Newburyport, Mass.) was dried at 180° C. under a nitrogen purge for 2 hours prior to use. The cocatalysts in these experiments, tert-butylchloride and glacial acetic acid, 99.99% (both from Aldrich, Milwaukee, Wis.) were used as received. Prior to use, the solvent was dried over 4 angstrom molecular sieves. The catalyst slurry was heated to 50° C. with stirring.

Piperylene concentrate (Naphtha Petroleum 3 "Piperylenes", Lyondell Petrochemical Company, Houston, Tex.), 35 grams, was added to the nitrogen purged reaction flask via syringe. Prior to use, the piperylene concentrate was dried by passing through a column of activated alumina (Fischer 8–16 mesh, 0.3 grams alumina to 1 milliliter monomer). The reaction solution was stirred at 50° C. for 4–6 hours at 50° C. and 15 hours at room temperature.

The resulting resin solution was separated from the catalyst by vacuum filtration at room temperature. After catalyst filtration, the reaction solution was washed with water to give a neutral pH. Solvents and volatile components were removed on a rotary evaporator by heating up to 50° C. at 0.25 mm Hg.

The resins produced have the properties listed in Table 6. Examples 19–21 are in accordance with the present invention, whereas as Comparison Example 22 is for comparison purposes.

TABLE 6

| | | | Molecular Weight | | | |
|---|---|---|---|---|---|---|
| Ex. | Catalyst | Yield | Mn | Mw | Mz | PD |
| 19 | Al(OTf)$_3$ - 8 wt % | 67% | 840 | 2530 | 10010 | 3.0 |
| 20 | Al(OTf)$_3$/tBuCl - 8 wt %/ 4 wt % | 67% | 710 | 2060 | 8770 | 2.9 |
| 21 | Al(OTf)$_3$/HOAc - 8 wt %/ 4 wt % | 72% | 420 | 620 | 900 | 1.5 |
| 22 | HOAc 0.5 wt % | 0% | — | — | — | — |

EXAMPLES 23 AND 24

Example 23 illustrates the use of aluminum tris (trifluoromethanesulfonic acid), also referred to as the tris (triflate) salts in the presence of a trifluoromethanesulfonic acid (triflic acid) cocatalyst for the polymerization of piperylene concentrate, a C5 monomer feed. Comparison Example 24 involves use of triflic acid for polymerization of piperylene concentrate and is for comparison purposes.

A 500 milliliter three neck flask was equipped with an overhead stirrer, reflux condenser, gas inlet and outlet ports, a thermometer, and a dropping addition funnel. The flask was charged with 30 grams toluene (reagent grade, Aldrich Milwaukee, Wis.) and catalyst in the weight percent based on monomer, as described below in Table 7. Prior to use, the solvent was dried over 4 angstrom molecular sieves.

Concerning the catalyst, the aluminum tris(triflate), Al(OTf)$_3$, (Strem Chemical, Newburyport, Mass.) was dried at 180° C. under a nitrogen purge for 2 hours prior to use. The triflic acid cocatalyst was used as received (99%+ Aldrich, Milwaukee, Wis.). The catalyst slurry was heated to 50° C. with stirring.

Piperylene concentrate (Naphtha Petroleum 3 "Piperylenes", Lyondell Petrochemical Company, Houston, Tex.), 70 grams, was added to the nitrogen purged reaction flask via the dropping addition funnel over 10 minutes. Prior to use, the piperylene concentrate was dried by passing through a column of activated alumina (Fischer 8–16 mesh, 0.3 grams alumina to 1 milliliter monomer). The reaction solution was stirred at 50° C. for 4–6 hours at 50° and 15 hours at room temperature.

The resulting resin solution was separated from the catalyst by vacuum filtration at room temperature. After catalyst filtration, the reaction solution was washed with water to give a neutral pH. Solvents and volatile components were removed on a rotary evaporator by heating up to 50° C. at 0.25 mm Hg.

The resins produced have the properties listed in Table 7. Example 23 is in accordance with the present invention, whereas Comparison Example 24 is for comparison purposes.

TABLE 7

| Ex. | Catalyst | Yield | Molecular Weight | | | |
|---|---|---|---|---|---|---|
| | | | Mn | Mw | Mz | PD |
| 23 | Al(OTf)$_3$/HOTf - 8 wt %/0.5 wt % | 54% | 490 | 900 | 1870 | 1.8 |
| 24 | HOTf - 0.5 wt % | 19% | 310 | 410 | 580 | 1.3 |

EXAMPLES 25 AND 26

These examples illustrate the effect of calcination of aluminum tris(triflate) catalyst for the polymerization of piperylene concentrate, a C5 monomer feed.

A 500 milliliter three neck flask was equipped with an overhead stirrer, reflux condenser, gas inlet and outlet ports, a thermometer, and a dropping addition funnel. The flask was charged with 60 grams toluene (reagent grade, Aldrich Milwaukee, Wis.). Prior to use the solvent was dried over 4 angstrom molecular sieves. The flask was also charged with aluminum tris(triflate) catalyst (Strem Chemical Inc., Newburyport, Mass.), which either was or was not calcined and in the amount based on monomer weight, as described in Table 8 below. The catalyst slurry was heated to 50° C. with stirring.

Piperylene concentrate (Naphtha Petroleum 3 "Piperylenes", Lyondell Petrochemical Company, Houston, Tex.), 140 grams, was added to the nitrogen purged reaction flask via the dropping addition funnel over 15 minutes. Prior to use, the piperylene concentrate was dried by passing through a column of activated alumina (Fischer 8–16 mesh, 0.3 grams alumina to 1 milliliter monomer). The reaction solution was stirred at 50° C. for 3 hours.

The resulting resin solution was separated from the catalyst by vacuum filtration at room temperature. After catalyst filtration, the reaction solution was washed with water to a neutral pH and dried over magnesium sulfate.

After catalyst filtration, the resin oil was placed in a round-bottom flask which was fitted with a distillation head with an adaptor for an inlet tube, thermometer, and attached to a condenser and receiving flask. The resin oil was heated to 235° C. with a nitrogen purge followed by a steam purge at 235–245° C. to remove light oil products. The steam purge was continued until less than 1 ml of oil was collected per 100 ml of steam condensate or until 1000 ml of steam condensate was collected. The steam purge was followed by a nitrogen purge at 235° C. to remove water from the remaining resin.

The resins produced have the properties listed in Table 8.

TABLE 8

| Ex. | Catalyst | Yield | Softening Point (R&B) | Molecular Weight | | | |
|---|---|---|---|---|---|---|---|
| | | | | Mn | Mw | Mz | PD |
| 25 | Al(OTf)$_3$ calcined 180° C. under N$_2$ 2 hour - 8 wt % | 21% | 60° C. | 750 | 890 | 1930 | 1.2 |
| 26 | Al(OTf)$_3$ as received - 8 wt % | 12% | 62° C. | 810 | 1030 | 10090 | 1.3 |

EXAMPLES 27–31

These examples illustrate the effect of aluminum tris (triflate) loading and acetic acid cocatalysts for the polymerization of piperylene concentrate, a C5 monomer feed.

A 500 milliliter three neck flask was equipped with an overhead stirrer, reflux condenser, gas inlet and outlet ports, a thermometer, and a dropping addition funnel. The flask was charged with 60 grams toluene (reagent grade, Aldrich Milwaukee, Wis.) and the aluminum tris(triflate) catalyst (Strem Chemical Inc., Newburyport, Mass.) calcined at 150° C. for 2 hours under vacuum (2–5 mm Hg). Prior to use, the solvent was dried over 4 angstrom molecular sieves. The catalyst loading based on weight of monomer is described in Table 9. Acetic acid (99.99% Aldrich, Milwaukee, Wis.) was added to the catalyst slurry via syringe when required and in the weight percent based on monomer, as described in Table 9. The catalyst slurry was heated to 50° C. with stirring.

Piperylene concentrate (Naphtha Petroleum 3 "Piperylenes", Lyondell Petrochemical Company, Houston, Tex.), 140 grams, was added to the nitrogen purged reaction flask via the dropping addition funnel over 15 minutes. Prior to use, the piperylene concentrate was dried by passing through a column of activated alumina (Fischer 8–16 mesh, 0.3 grams alumina to 1 milliliter monomer). The reaction solution was stirred at 25° C. for 20 hours.

The resulting resin solution was separated from the catalyst by vacuum filtration at room temperature. After catalyst filtration, the reaction solution was quenched with 4 ml NH$_4$OH in 100 ml water, washed with water to a neutral pH, and dried over magnesium sulfate. The volatile components and solvent were removed by heating the reaction solution to 50° C. under vacuum (2–5 mm Hg).

The resin oil was then placed in a round-bottom flask which was fitted with a distillation head with an adaptor for an inlet tube, thermometer, and attached to a condenser and receiving flask. The resin oil was heated to 235° C. with a nitrogen purge followed by a steam purge at 235–245° C. to remove light oil products. The steam purge was continued until less than 1 ml of oil was collected per 100 ml of steam condensate or until 1000 ml of steam condensate was collected. The steam purge was followed by a nitrogen purge at 235° C. to remove water from the remaining resin.

The resins produced have the properties listed in Table 9.

TABLE 9

| Ex. | Catalyst | Yield | Softening Point (R&B) | Molecular Weight | | | |
|---|---|---|---|---|---|---|---|
| | | | | Mn | Mw | Mz | PD |
| 27 | Al(OTf)$_3$ 8 wt % | 42% | 47° C. | 720 | 1010 | 1520 | 1.4 |
| 28 | Al(OTf)$_3$ 4 wt % | 15% | 69° C. | 780 | 1030 | 1430 | 1.3 |
| 29 | Al(OTf)$_3$/HOAc 8 wt %/0.5 wt % | 34% | 42° C. | 720 | 990 | 3070 | 1.4 |
| 30 | Al(OTf)$_3$/ HOAc 4 wt %/0.5 wt % | 28% | 54° C. | 700 | 940 | 1330 | 1.3 |
| 31 | Al(OTf)$_3$/HOAc 4 wt %/0.25 wt % | 37% | 39° C. | 720 | 930 | 1950 | 1.3 |

EXAMPLES 32 AND 33

These examples illustrate the use of an aluminum tris (triflate) catalyst supported on silica for the polymerization of piperylene concentrate, a C5 monomer feed, and reuse of this catalyst.

Catalyst Preparation

A 250 milliliter three neck round bottom flask fitted with a magnetic stirring bar, reflux condenser, and a heating mantle was charged with 2.0 grams of aluminum powder (Aldrich, Milwaukee, Wis.), "EP12" silica (Crosfield Catalysts, Warrington, England), and 100 milliliters of distilled water. A stoichiometric excess of trifluoromethanesulfonic acid (Aldrich, Milwaukee, Wis.) was added to the slurry dropwise over 2–5 minutes. The reaction solution was heated to reflux with stirring for 6 hours.

The water was stripped from the catalyst product using a rotary evaporator under vacuum (2–5 mm Hg) with heating up to 80° C. The catalyst was further dried under a nitrogen purge at 40° C. for 4 hours followed by continued nitrogen purge at 20° C. for 16 hours.

Polymerization

A 500 milliliter three neck flask was equipped with an overhead stirrer, reflux condenser, gas inlet and outlet ports, a thermometer, and a dropping addition funnel. The flask was charged with 60 grams toluene (reagent grade, Aldrich Milwaukee, Wis.) and the supported aluminum tris(triflate) catalyst as prepared above and in the weight percentage based on monomer in Table 10. Prior to use, the solvent was dried over 4 angstrom molecular sieves. Also prior to use, the catalyst was flushed with dry nitrogen for 16 hours at room temperature, heated to 1 80° C. under a nitrogen purge over 4 hours, and purged for an additional 16 hours under nitrogen at room temperature. The catalyst slurry was maintained at 25° C. with stirring.

Piperylene concentrate (Naphtha Petroleum 3 "Piperylenes", Lyondell Petrochemical Company, Houston, Tex.), 140 grams, was added to the nitrogen purged reaction flask via the dropping addition funnel over 15 minutes. Prior to use, the piperylene concentrate was dried by passing through a column of activated alumina (Fischer 8–16 mesh, 0.3 grams alumina to 1 milliliter monomer). The reaction solution was stirred at 25° C. for 20 hours.

The resulting resin solution was separated from the catalyst by vacuum filtration at room temperature. After catalyst filtration, the reaction solution was quenched with 4 ml $NH_4OH$ in 100 ml water, washed with water to a neutral pH, and dried over magnesium sulfate. The volatile components and solvent were removed by heating the reaction solution to 50° C. under vacuum (2–5 mm Hg).

The resin oil was then placed in a round-bottom flask which was fitted with a distillation head with an adaptor for an inlet tube, thermometer, and attached to a condenser and receiving flask. The resin oil was heated to 235° C. with a nitrogen purge followed by a steam purge at 235–245° C. to remove light oil products. The steam purge was continued until less than 1 ml of oil was collected per 100 ml of steam condensate or until 1000 ml of steam condensate was collected. The steam purge was followed by a nitrogen purge at 235° C. to remove water from the remaining resin.

The resins produced have the properties listed in Table 10.

TABLE 10

| Ex. | Catalyst | Yield | Softening Point (R&B) | Mn | Mw | Mz | PD |
|---|---|---|---|---|---|---|---|
| 32 | Al(OTf)$_3$ on silica 16 wt % | 17% | 46° C. | 1090 | 1550 | 2450 | 1.4 |
| 33 | Al(OTf)$_3$ on silica reuse | 36% | oil | | 830 | 1220 | 1850 | 1.5 |

EXAMPLE 34

This example illustrates the use of catalyst prepared from trifluoromethanesulfonic acid and clay for the polymerization of piperylene, a C5 feed stream.

Catalyst Preparation

In a 1 liter 3 neck flask, 150 grams of toluene and 100 grams "F-22" Bentonite acid-leached powder (available from Engelhard, Corporation, Jackson Miss.) were agitated with an overhead stirrer. A solution of 10 grams of trifluoromethanesulfonic acid in 100 grams of toluene was added over 45 minutes. The resulting solution was stirred for 21 hours. After filtration and washing with toluene, acetone, and water, the material was rotary evaporated for 6 hours at 130° C. and 6 mm Hg.

Polymerization

A 500 milliliter three neck flask was equipped with a cooling jacket overhead stirrer, reflux condenser, gas inlet and outlet ports, thermometer, and dropping addition funnel. The trifluoromethanesulfonic acid on clay as prepared above, 20 grams, was calcined at 200° C. for 2 hours. The 20 grams of catalyst and 135 grams of toluene were added to the flask. Using the dropping addition funnel, 210 grams of piperylene (Lyondell Petrochemical Company, Houston Tex.) was added over 18 minutes. The temperature was maintained at 20° C.±5° C. for a total reaction time of 60 minutes.

At the end of the reaction time, the catalyst was filtered from the reaction solution. The resin solution was then rotary evaporated with a final condition of 45 minutes with a 190° C. bath temperature at <5 mm Hg.

The resin had the properties listed in Table 11.

TABLE 11

| Ex. | Catalyst | Yield | Softening Point (R&B) | Mn | Mw | Mz |
|---|---|---|---|---|---|---|
| 34 | Trifluoromethane sulfonic acid on clay | 15% | 14° C. | 907 | 2460 | 6123 |

EXAMPLE 35–37

These examples illustrate the use of catalyst prepared from aluminum triflate and clay for the polymerization of piperylene, a C5 feed stream.

Catalyst Preparation

To 40 ml of methanol and 10 ml of glacial acetic acid was added 1.25 grams of aluminum triflate (Alfa, Ward Hill Mass.). After 1 hour of agitation the solids were filtered out and the remaining solution was added dropwise to 50 grams of "F-22" acid treated clay (Bentonite acid-leached powder, Engelhard, Corporation, Jackson Miss.). The resultant clay material was allowed to dry in air for >24 hours. The clay material was then rotary evaporated at 110° C. and 2 mm for 2 hours.

This preparation was then repeated with 2.5 and 5 grams of aluminum triflate (Alfa, Ward Hill Mass.).

Polymerization

A 500 milliliter three neck flask was equipped with a cooling jacket overhead stirrer, reflux condenser, gas inlet and outlet ports, thermometer, and dropping addition funnel.

The aluminum triflate on clay, 10 grams, as prepared above was calcined at 200° C. for 2 hours. The 20 grams of catalyst and 135 grams of toluene were added to the flask. Using the dropping addition funnel, 210 grams of piperylene (Lyondell Petrochemical Company, Houston Tex.) was added over 18 minutes. The temperature was maintained at 20° C.±5° C. for a total reaction time of 60 minutes.

At the end of the reaction time, the catalyst was filtered from the reaction solution. The resin solution was rotary evaporated with a final condition of 45 minutes with a 190° C. bath temperature at <5 mm Hg.

The resins had the properties listed in Table 12.

TABLE 12

| Ex. | Catalyst Loading Based on Weight of Clay | Yield | Softening Point (R&B) | Molecular Weight | | |
|---|---|---|---|---|---|---|
| | | | | Mn | Mw | Mz |
| 35 | 2.5 wt % | 6% | 12° C. | 951 | 2958 | 7742 |
| 36 | 5 wt % | 6% | 8.7° C. | 886 | 2755 | 8011 |
| 37 | 10 wt % | 12% | | 865 | 1324 | 3313 | was washed with a 0.1 M ammonium hydroxide solution (Aldrich, Milwaukee, Wis.) to neutralize any soluble acids, and then washed with water until the pH of the aqueous layer was neutral. The resin solution was then dried over magnesium sulfate (Aldrich, Milwaukee, Wis.) and filtered to remove the drying agent.

The flask containing the resin solution was fitted with a distillation head with an adaptor for an inlet tube and a thermometer, and attached to a condenser with a receiving flask. The resin oil was heated to 235° C. with a nitrogen purge followed by a steam purge at 235–245° C. to remove light oil products. The steam purge was continued until less than 1 milliliter of oil was collected per 100 milliliters of steam condensate or until 1000 milliliters of steam condensate was collected. The steam purge was followed by a nitrogen purge at 235° C. to remove water from the remaining resin.

The resin had the properties listed in Table 13.

TABLE 13

| Ex. | Al(OTf₃) Loading | CH₃COOH Loading | Yield | Softening Point (R&B) | Molecular Weight | | | |
|---|---|---|---|---|---|---|---|---|
| | | | | | Mn | Mw | Mz | PD |
| 38 | 1 wt % | 0 | 2% | — | 760 | 1740 | 6320 | 2.3 |
| 39 | 2 wt % | 0 | 7% | — | 260 | 860 | 5480 | 3.3 |
| 40 | 4 wt % | 0 | 22% | 80° C. | 460 | 570 | 870 | 1.3 |
| 41 | 1 wt % | 0.25 wt % | 6% | 80° C. | 470 | 630 | 1560 | 1.3 |
| 42 | 2 wt % | 0.25 wt % | 23% | 55° C. | 360 | 450 | 650 | 1.2 |
| 43 | 4 wt % | 0.25 wt % | 37% | 79° C. | 460 | 580 | 890 | 1.2 |
| 44 | 1 wt % | 0.5 wt % | 8% | 95° C. | 520 | 670 | 1470 | 1.3 |
| 45 | 2 wt % | 0.5 wt % | 25% | 69° C. | 420 | 500 | 640 | 1.2 |
| 46 | 4 wt % | 0.5 wt % | 29% | 82° C. | 450 | 550 | 1850 | 1.2 |

EXAMPLES 38–46

These examples illustrate the use of aluminum tris (trifluoromethanesulfonic acid), also referred to as the tris (triflate) salt, alone or in the presence of a cocatalyst for the polymerization of a C9 monomer feed.

A 500 milliliter three neck round bottom flask was equipped with an overhead stirrer, reflux condenser, gas inlet and outlet ports, and a thermometer. The flask was charged with 50 grams of toluene (reagent grade, Aldrich, Milwaukee, Wis.) which had been dried over 4 angstrom molecular sieves. The catalyst, aluminum tris(triflate), Al(OTf₃)₃, (Strem Chemical, Newburyport, Mass.) was dried at 180° C. under a nitrogen purge for 2 hours prior to use and charged to the flask against a nitrogen purge. Where a cocatalyst was used, acetic acid, (glacial 99.99%, Aldrich, Milwaukee, Wis.) was added to the stirred catalyst solution via syringe. The catalyst solution was heated to 50° C.

The C9 monomer, "LRO-90", (Lyondell Petrochemicals, Houston, Tex.) was added dropwise over 15 minutes maintaining the reaction temperature at 50° C. using external cooling if needed. Prior to use, the monomer was dried by passing through a column of activated alumina (Fischer 8–16 mesh, 0.3 grams alumina to 1 milliliter monomer). The reaction solution was stirred at 50° C. for a total reaction time of 2 hours.

Upon completion of the reaction time, the solution was filtered to remove the solid catalyst. The reaction solution While the invention has been described in connection with certain preferred embodiments so that aspects thereof may be more fully understood and appreciated, it is not intended to limit the invention to these particular embodiments. On the contrary, it is intended to cover all alternatives, modifications and equivalents as may be included within the scope of the invention as defined by the appended claims.

What is claimed is:

1. A process for making a hydrocarbon resin, comprising polymerizing a feed stream comprising at least one member selected from the group consisting of pure monomer comprising C5 or higher monomer, and C5 monomers, and C9 monomers in the presence of a fluorinated solid acid catalyst to produce a hydrocarbon resin, wherein the fluorinated solid acid catalyst comprises at least one member selected from the group consisting of perfluoroalkanesulfonic acid, perfluoroalkanesulfonimide, lanthanide perfluoroalkanesulfonate, aluminum perfluoroalkanesulfonate with each alkane group containing at least 2 carbons, lanthanide triflate with acid promoter, and supported fluorinated solid acid which is supported on one of clay, silica, silica-alumina, and zeolite, and wherein the hydrocarbon resin has a number average molecular weight (Mn) ranging from about 400 to 2000 for feed streams comprising at least pure monomer, about 400 to 2000 for feed streams comprising at least C5 monomers, and about 400 to 1200 for feed streams comprising at least C9 monomers.

2. The process of claim 1, wherein substantially all freely-associated water has been removed from the fluorinated solid acid catalyst.

3. The process of claim 2, wherein water removal from the fluorinated solid acid catalyst comprises calcining at a temperature up to about 700° C.

4. The process of claim 1, wherein the fluorinated solid acid catalyst comprises perfluoroalkanesulfonic acid comprising at least one member selected from the group consisting of perfluorooctanesulfonic acid, perfluorododecanesulfonic acid, and perfluoroalkanesulfonic acid grafted to polymer.

5. The process of claim 1, wherein the fluorinated solid acid comprises perfluoroalkanesulfonimide.

6. The process of claim 1, wherein the fluorinated solid acid comprises lanthanide perfluoroalkanesulfonate with each alkane group containing at least 2 carbons.

7. The process of claim 1, wherein the fluorinated solid acid comprises aluminum perfluoroalkanesulfonate with each alkane group containing at least 2 carbons.

8. The process of claim 1, wherein the fluorinated solid acid comprises lanthanide triflate with acid promoter.

9. The process of claim 1, wherein the fluorinated solid acid comprises supported fluorinated solid acid catalyst which is supported on one of clay, silica, silica-alumina, and zeolite.

10. The process of claim 1, wherein the feed stream comprises at least pure monomer comprising at least one member selected from the group consisting of styrene, alpha-methyl styrene, beta-methyl styrene, 4-methyl styrene, and vinyl toluene fractions.

11. The process of claim 1, wherein the feed stream comprises at least C5 monomers comprising at least one member selected from the group consisting of 2-methyl-2-butene, 1-pentene, 2-methyl-1-pentene, 2-methyl-2-pentene, 2-pentene, cyclopentene, cyclohexene, 1,3-pentadiene, 1,4-pentadiene, isoprene, 1,3-hexadiene, 1,4-hexadiene, cyclopentadiene, and dicyclopentadiene.

12. The process of claim 1, wherein the feed stream comprises at least C9 monomers comprising at least one member selected from the group consisting of styrene, vinyl toluene, indene, dicyclopentadiene, and alkylated derivatives thereof.

13. The process of claim 1, wherein the feed stream is contacted with about 0.5 wt % to 30 wt % of the fluorinated solid acid catalyst based on monomer weight in a batch reactor.

14. The process of claim 1, wherein the feed stream is added to a slurry of the fluorinated solid acid catalyst in solvent.

15. The process of claim 1, wherein the feed stream is polymerized at a reaction temperature between about −50° C. and 150° C.

16. The process of claim 1, wherein the feed stream comprises at least pure monomer, and wherein the hydrocarbon resin has a weight average molecular weight (Mw) ranging from about 500 to 5000, a Z average molecular weight (Mz) ranging from about 500 to 10,000, and a polydispersity (PD) as measured by Mw/Mn between about 1.2 and 3.5, where Mn, Mw, and Mz are determined by size exclusion chromatography (SEC).

17. The process of claim 1, wherein the feed stream comprises at least C5 monomers, and wherein the hydrocarbon resin has a weight average molecular weight (Mw) of about 500 to 3500, a Z average molecular (Mz) of about 700 to 15,000, and a polydispersity (PD) as measured by Mw/Mn between about 1.2 and 5, where Mn, and Mw, and Mz are determined by size exclusion chromatography (SEC).

18. The process of claim 1, wherein the feed stream comprises at least C9 monomers, and wherein the hydrocarbon resin has a weight average molecular weight (Mw) of about 500 to 2,000, a Z average molecular weight (Mz) of about 700 to 6000, and a polydispersity (PD) as measured by Mw/Mn between about 1.2 and 3.5, where Mn, Mw, and Mz are determined by size exclusion chromatography (SEC).

19. The process of claim 1, wherein the fluorinated solid acid catalyst is added to the feed stream.

20. A process for making a hydrocarbon resin, comprising polmerizing a feed stream comprising C9 monomers in the presence of a fluorinated solid acid catalyst to produce a hydrocarbon resin, wherein the fluorinated solid acid catalyst is added to the feed, and wherein the hydrocarbon resin has a number average molecular weight (Mn) of about 400 to 1200, a weight average molecular weight (Mw) of about 500 to 2000, a Z average molecular weight (Mz) of about 700 to 6000, and a polydispersity (PD) as measured by Mw/Mn between about 1.2 and 3.5, where Mn, Mw, and Mz are determined by size exclusion chromatography (SEC).

21. The process of claim 20, wherein substantially all freely-associated water has been removed from the fluorinated solid acid catalyst.

22. The process of claim 21, wherein the water removal from the fluorinated solid acid catalyst comprises calcining at a temperature up to about 700° C.

23. The process of claim 20, wherein the fluorinated solid acid catalyst comprises perfluorinated ion exchange polymer.

24. The process of claim 20, wherein the fluorinated solid acid catalyst comprises perfluoroalkanesulfonic acid comprising at least one member selected from the group consisting of perfluorooctanesulfonic acid, perfluorododecanesulfonic acid, and perfluoroalkanesulfonic acid grafted to polymer.

25. The process of claim 20, wherein the fluorinated solid acid comprises perfluoroalkanesulfonimide.

26. The process of claim 20, wherein the fluorinated solid acid comprises lanthanide perfluoroalkanesulfonate with each alkane group containing one or more carbon.

27. The process of claim 20, wherein the fluorinated solid acid comprises aluminum perfluoroalkanesulfonate with each alkane group containing one or more carbon.

28. The process of claim 20, wherein the fluorinated solid acid comprises lanthanide triflate with acid promoter.

29. The process of claim 20, wherein the fluorinated solid acid comprises aluminum triflate with acid promoter.

30. The process of claim 20, wherein the fluorinated solid acid comprises supported fluorinated solid acid catalyst.

31. The process of claim 20, wherein the feed stream comprises at least one member selected from the group consisting of styrene, vinyl toluene, indene, dicyclopentadiene, and alkylated derivatives thereof.

32. The process of claim 20, wherein the feed stream is contacted with about 0.5 wt % to 30 wt % of the fluorinated solid acid catalyst based on monomer weight in a batch reactor.

33. The process of claim 20, wherein the feed stream is polymerized at a reaction temperature between about −50° C. and 150° C.

34. A process for making a hydrocarbon resin, comprising polymerizing a feed stream comprising an aromatic pure monomer in the presence of a fluorinated solid acid catalyst to produce a hydrocarbon resin, wherein the fluorinated solid acid catalyst comprises at least one member selected from the group consisting of lanthanide perfluoroalkanesulfonate and aluminum perfluoroalkanesulfonate.

35. A process for making a hydrocarbon resin, comprising polymerizing a feed stream comprising at least one member selected from the group consisting of pure monomer comprising C5 or higher monomer, C5 monomers, and C9 monomers in the presence of a fluorinated solid acid catalyst to produce a hydrocarbon resin, wherein the fluorinated solid acid catalyst comprises at least one member selected from the group consisting of perfluoroalkanesulfonic acid with each alkane group containing at least 6 carbons, perfluoroalkanesulfonimide, lanthanide perfluoroalkanesulfonate with each alkane group containing at least 2 carbons, aluminum perfluoroalkanesulfonate with each alkane group containing at least 2 carbons, and lanthanide triflate with acid promoter.

36. A process for making a hydrocarbon resin, comprising polymerizing a feed stream comprising C5 monomers in the presence of a fluorinated solid acid catalyst to produce a hydrocarbon resin, wherein the fluorinated solid acid catalyst comprises at least one member selected from the group consisting of perfluorinated ion exchange resin, perfluoroalkanesulfonic acid, perfluoroalkanesulfonimide, lanthanide perfluoroalkanesulfonate, aluminum perfluoroalkanesulfonate with each alkane group containing at least 2 carbons, lanthanide triflate with acid promoter, and supported fluorinated solid acid, and wherein the hydrocarbon resin has a number average molecular weight (Mn) ranging from about 400 to 2000.

37. The process of claim 36, wherein substantially all freely-associated water has been removed from the fluorinated solid acid catalyst.

38. The process of claim 36, wherein the fluorinated solid acid catalyst comprises perfluorinated ion exchange resin.

39. The process of claim 36, wherein the fluorinated solid acid catalyst comprises perfluoroalkanesulfonic acid comprising at least one member selected from the group consisting of perfluorooctanesulfonic acid, perfluorododecanesulfonic acid, and perfluoroalkanesulfonic acid grafted to polymer.

40. The process of claim 36, wherein the fluorinated solid acid comprises perfluoroalkanesulfonimide.

41. The process of claim 36, wherein the fluorinated solid acid comprises lanthanide perfluoroalkanesulfonate.

42. The process of claim 36, wherein the fluorinated solid acid comprises aluminum perfluoroalkanesulfonate with each alkane group containing at least 2 carbons.

43. The process of claim 36, wherein the fluorinated solid acid comprises lanthanide triflate with acid promoter.

44. The process of claim 36, wherein the fluorinated solid acid comprises supported fluorinated solid acid.

45. The process of claim 36, wherein the feed stream comprises at least one member selected from the group consisting of 2-methyl-2-butene, 1-pentene, 2-methyl-1-pentene, 2-methyl-2-pentene, 2-pentene, cyclopentene, cyclohexene, 1,3-pentadiene, 1,4-pentadiene, isoprene, 1,3-hexadiene, 1,4-hexadiene, cyclopentadiene, and dicyclopentadiene.

46. The process of claim 36, wherein the hydrocarbon resin has a weight average molecular weight (Mw) of about 500 to 3500, a Z average molecular weight (Mz) of about 700 to 15,000, and a polydispersity (PD) as measured by Mw/Mn between about 1.2 and 5, where Mn, Mw, and Mz are determined by size exclusion chromatography (SEC).

47. The process of claim 36, wherein the fluorinated solid acid catalyst is added to the feed stream.

48. The process for making a hydrocarbon resin, comprising:
polymerizing a feed stream comprising at least one member selected from the group consisting of pure monomer comprising C5 or higher monomer and C9 monomers by adding a fluorinated solid acid catalyst to the feed to produce a resin solution containing hydrocarbon resin; and
stripping the resin solution to remove unreacted hydrocarbons and oligomers;
wherein the feed stream comprises at least one of:
pure monomer, and the hydrocarbon resin has a number average molecular weight (Mn) ranging from about 400 to 2000, a weight average molecular weight (Mw) ranging from about 500 to 5000, a Z average molecular weight (Mz) ranging from about 500 to 10,000, and a polydispersity (PD) as measured by Mw/Mn between about 1.2 and 3.5, where Mn, Mw, and Mz are determined by size exclusion chromatography (SEC); and
C9 monomers, and wherein the hydrocarbon resin has a number average molecular weight (Mn) of about 400 to 1200, a weight average molecular weight (Mw) of about 500 to 2000, a Z average molecular weight (Mz) of about 700 to 6000, and a polydispersity (PD) as measured by Mw/Mn between about 1.2 and 3.5, where Mn, Mw, and Mz are determined by size exclusion chromatography (SEC).

49. The process of claim 48, wherein substantially all freely-associated water has been removed from the fluorinated solid acid catalyst.

50. The process of claim 48, wherein the fluorinated solid acid catalyst comprises perfluorinated ion exchange polymer.

51. The process of claim 48, wherein the fluorinated solid acid catalyst comprises perfluoroalkanesulfonic acid containing at least 6 carbons comprising at least one member selected from the group consisting of perfluorooctanesulfonic acid, perfluorododecanesulfonic acid, and perfluoroalkanesulfonic acid grafted to polymer.

52. The process of claim 48, wherein the fluorinated solid acid catalyst comprises perfluoroalkanesulfonimide.

53. The process of claim 48, wherein the fluorinated solid acid catalyst comprises lanthanide perfluoroalkanesulfonate wherein each alkane group contains one or more carbon.

54. The process of claim 48, wherein the fluorinated solid acid catalyst comprises aluminum perfluoroalkanesulfonate wherein each alkane group contains one or more carbon.

55. The process of claim 48, wherein the fluorinated solid acid catalyst comprises lanthanide triflate with acid promoter.

56. The process of claim 48, wherein the fluorinated solid acid catalyst comprises aluminum triflate with acid promoter.

57. The process of claim 48, wherein the fluorinated solid acid catalyst comprises supported fluorinated solid acid catalyst.

58. The process of claim 48, wherein the feed stream comprises at least pure monomer, and wherein the hydrocarbon resin has a number average molecular weight (Mn) ranging from about 400 to 2000, a weight average molecular weight (Mw) ranging from bout 500 to 5000, a Z average molecular weight (Mz) ranging from about 500 to 10,000, and a polydispersity (PD) as measured by Mw/Mn between about 1.2 and 3.5, where Mn, Mw, and Mz are determined by size exclusion chromatography (SEC).

59. The process of claim 48, wherein the feed stream comprises at least C9 monomers, and wherein the hydrocarbon resin has a number average molecular weight (Mn) of about 400 to 1200, a weight average molecular weight (Mw) of about 500 to 2000, a Z average molecular weight (Mz) of about 700 to 6000, and a polydispersity (PD) as measured by Mw/Mn between about 1.2 and 3.5, where Mn, Mw, and Mz are determined by size exclusion chromatography (SEC).

60. A process for making a hydrocarbon resin, comprising polymerizing a feed stream comprising C5 monomers in the presence of perfluorinated ion exchange resin to produce a hydrocarbon resin.

61. A process for making a hydrocarbon resin, comprising:

polymerizing a feed stream comprising at least one member selected from the group consisting of pure monomer comprising C5 or higher monomer, C5 monomers, and C9 monomers by adding a fluorinated solid acid catalyst to the feed to produce a resin solution containing hydrocarbon resin; and stripping the resin solution to remove unreacted hydrocarbons and oligomers;

wherein the fluorinated solid acid catalyst comprises at least one of:

perfluoroalkanesulfonic acid containing at least 6 carbons comprising at least one member selected from the group consisting of perfluorooctanesulfonic acid, perfluorododecanesulfonic acid, and perfluoroalkanesulfonic acid grafted to polymer;

perfluoroalkanesulfonimide;

lanthanide perfluoroalkanesulfonate wherein each alkane group contains one or more carbon;

aluminum perfluoroalkanesulfonate wherein each alkane group contains one or more carbon; and lanthanide triflate with acid promoter.

* * * * *